United States Patent
Gaddam et al.

(10) Patent No.: US 12,034,837 B2
(45) Date of Patent: Jul. 9, 2024

(54) GATEWAY AGNOSTIC TOKENIZATION

(71) Applicant: Visa International Service Association, San Francisco, CA (US)

(72) Inventors: Sivanarayana Gaddam, San Francisco, CA (US); Pratyay Mukherjee, Santa Clara, CA (US); Gaven Watson, Palo Alto, CA (US)

(73) Assignee: Visa International Service Association, San Francisco, CA (US)

( * ) Notice: Subject to any disclaimer, the term of this patent is extended or adjusted under 35 U.S.C. 154(b) by 333 days.

(21) Appl. No.: 17/633,719

(22) PCT Filed: Jan. 30, 2020

(86) PCT No.: PCT/US2020/015797
§ 371 (c)(1),
(2) Date: Feb. 8, 2022

(87) PCT Pub. No.: WO2021/040784
PCT Pub. Date: Mar. 4, 2021

(65) Prior Publication Data
US 2022/0329414 A1  Oct. 13, 2022

Related U.S. Application Data
(60) Provisional application No. 62/894,057, filed on Aug. 30, 2019.

(51) Int. Cl.
*H04L 9/08* (2006.01)
*H04L 9/40* (2022.01)
(52) U.S. Cl.
CPC .......... *H04L 9/0822* (2013.01); *H04L 9/0861* (2013.01)

(58) Field of Classification Search
CPC ........................... H04L 9/0822; H04L 9/0861
(Continued)

(56) References Cited

U.S. PATENT DOCUMENTS

| 9,864,874 B1* | 1/2018 | Shanbhag | H04L 63/10 |
| 2009/0006865 A1* | 1/2009 | Zunke | H04L 9/06 713/193 |

(Continued)

FOREIGN PATENT DOCUMENTS

| EP | 1782265 A2 | 5/2007 |
| EP | 1782265 B1 | 10/2015 |

(Continued)

OTHER PUBLICATIONS

Casimer DeCusatis; Implementing Zero Trust Cloud Networks with Transport Access Control and First Packet Authentication; IEEE: 2016; pp. 5-10.*

(Continued)

*Primary Examiner* — Monjur Rahim
(74) *Attorney, Agent, or Firm* — Kilpatrick Townsend & Stockton LLP

(57) ABSTRACT

Methods and systems for gateway agnostic tokenization are disclosed. Gateway agnostic tokenization enables a resource provider to quickly, safely, and efficiently route a token for authorization via any appropriate gateway computer. As part of an interaction with a user, a resource provider can transmit a token to an edge computer. The edge computer can then forward the token to a gateway computer. The gateway computer can identify a data item comprising two ciphertexts associated with the token. The edge computer and gateway computer can collectively decrypt the two ciphertexts to obtain a credential. The gateway computer can then forward the credential to an authorizing entity com- (Continued)

puter. The authorizing entity computer can then determine whether or not to authorize the interaction.

20 Claims, 10 Drawing Sheets

(58) Field of Classification Search
USPC .......................................................... 713/168
See application file for complete search history.

(56) References Cited

U.S. PATENT DOCUMENTS

| | | | | |
|---|---|---|---|---|
| 2011/0119481 | A1* | 5/2011 | Auradkar | G06F 21/602 |
| | | | | 713/150 |
| 2011/0145593 | A1* | 6/2011 | Auradkar | H04L 9/0833 |
| | | | | 713/189 |
| 2013/0179679 | A1* | 7/2013 | Broustis | H04L 9/0822 |
| | | | | 713/152 |
| 2015/0163056 | A1* | 6/2015 | Nix | H04L 63/062 |
| | | | | 380/46 |
| 2017/0034133 | A1* | 2/2017 | Korondi | H04L 63/083 |
| 2018/0359100 | A1* | 12/2018 | Gaddam | H04L 9/3215 |
| 2019/0188696 | A1 | 6/2019 | Carpenter et al. | |

FOREIGN PATENT DOCUMENTS

| | | |
|---|---|---|
| WO | 2008156452 A1 | 12/2008 |
| WO | 2019147251 A1 | 8/2019 |

OTHER PUBLICATIONS

CN202080059538.3 , "Office Action", dated Dec. 16, 2023, 16 pages.
EP20858809.5, "Extended European Search Report", dated Oct. 4, 2022, 9 pages.
Nunez et al., "Proxy Re-Encryption: Analysis of Constructions and Its Application to Secure Access Delegation", Journal of Network and Computer Applications, vol. 87, Mar. 8, 2017, pp. 193-209.
PCT/US2020/015797 , "International Search Report and Written Opinion", dated May 25, 2020, 10 pages.

* cited by examiner

GATEWAY AGNOSTIC TOKENIZATION

CROSS-REFERENCE TO RELATED APPLICATIONS

This application is a National Stage of International Application No. PCT/US2020/015797, filed on Jan. 30, 2020, which claims the benefit of U.S. Provisional Application No. 62/894,057, filed on Aug. 30, 2019, which is herein incorporated by reference in their entirety.

BACKGROUND

A conventional model of a resource exchange system may comprise users, resource providers, and authorizing entities. A user may be a person or other entity that desires a resource provided by the resource provider (e.g., a government or business) during an interaction between the resource provider and the user. The authorizing entity may be an entity that decides whether to authorize the interaction, enabling the transfer of the resource to the user. As examples, an authorizing entity may be a government agency or a bank that maintains an account for the user. In some cases, the resource exchange system may be computerized, i.e., rather than the user, resource provider and authorizing entity interacting directly, these entities may communicate over a computer network via a user device, resource provider computer, and authorizing entity computer respectively.

During a resource exchange interaction, the user may authenticate themselves using a credential. The credential indicates to the other entities (particularly the authorizing entity computer) that the user is who they claim to be. The user may provide the credential to the resource provider, who may in turn forward the credential to the authorizing entity. The authorizing entity computer may evaluate the credential (e.g., verify its veracity) and authorize the interaction. Upon the interaction being authorized, the resource provider may provide the resource to the user.

These resource exchange systems, computerized or otherwise, are vulnerable to credential fraud (e.g., identity fraud). If a fraudster acquires a user's credential, the fraudster can impersonate the user to acquire resources from the resource provider. As an example, a fraudster could use a credential associated with a reputable scientist to acquire a controlled chemical substance from a government agency. As another example, a fraudster could user a credential associated with a consumer in order to purchase goods from a merchant resource at cost to the consumer.

Modern computerized resource exchange systems are further complicated by their size and complexity. Large numbers of user devices, resource provider computers, and authorizing entity computers may be involved in large numbers of resource exchange interactions every second. Modern computerized resource exchange systems may additionally include gateway computers, computers whose purpose is routing messages between resource provider computers, authorizing entity computers, or other computers in the computerized resource exchange system. Rather than identifying and routing credentials to a large number of authorizing entity computers, a resource provider computer instead can route credentials to a smaller number of gateway computers. The gateway computers can then identify an authorizing entity computer associated with that particular credential and route the credential to that authorizing entity computer. Thus gateway computers reduce the routing burden on resource provider computers.

The size and complexity of computerized resource exchange systems creates fraud vulnerability, particularly in relation to credential exchange. A credential may pass from a user device, to a resource provider computer, to a gateway computer, through any number of network computers and finally to an authorizing entity computer. At each stage in this process, a fraudster, executing a man-in-the-middle attack (or any other viable attack) can intercept the credential and store it for later fraudulent use.

To alleviate this, some computerized resource exchange systems use tokens. A token may comprise a substitute for a credential. During an interaction, rather than providing a credential (e.g., a personal account number (PAN), social security number (SSN), etc.), a user may provide a token to the resource provider computer. The token may be forwarded to a token server computer, which may then detokenize the token, retrieving the credential that the token substitutes. The credential ay then be transmitted to an authorizing entity computer that may then authorize the interaction. Like a traditional credential, a token can be stolen and misused by fraudsters. However, it is typically easier to replace a token than its corresponding credential.

While token systems do alleviate some of the risk associated with computerized resource exchange, they introduce additional problems related to routing, latency, and integration overhead. Using a token-based computerized resource exchange system, as described above, during each interaction, a gateway computer must communicate with the token server computer in order to detokenize the credential. This increases the amount of time it takes for the credential to reach the authorizing entity computer, in order for the authorizing entity computer to authorize the interaction. Likewise, resource provider computers are often restricted to processing interactions via a single gateway computer. If the single gateway computer is put offline, the resource provider computer cannot process interactions, and the resource provider cannot provide resources to users. Embodiments address these and other problems, individually and collectively.

SUMMARY

Methods and systems for performing gateway agnostic tokenization are disclosed. Gateway agnostic tokenization may refer to a process by which a resource provider computer can route a token or credential to an authorizing entity computer during a resource exchange interaction (e.g., a sale between a merchant and a customer). Gateway agnostic tokenization allows a resource provider computer to route a token corresponding to a credential (e.g., a payment account number, or PAN) to an authorizing entity via any gateway computer of a number of gateway computers, rather than being restricted to a single gateway computer. Further, gateway agnostic tokenization allows the routing process to be completed even if a gateway computer becomes unresponsive (e.g., crashes) during the routing process. Additionally, gateway agnostic tokenization increases the speed of authorization, because unlike conventional resource exchange systems, a gateway agnostic system does not require tokens to be routed to token servers for detokenization. Further, gateway agnostic tokenization provides for the security and confidentiality of sensitive credentials (e.g., PANs, SSNs, Medical Record Numbers (MRNs), etc.).

In a gateway agnostic tokenization system, during a resource exchange, an edge computer can receive a token from a resource provider computer. As an example, the resource provider could be an online merchant, and the token could be a substitute for a credential that the merchant stores on its servers. An edge computer may refer to a computer in an "edge" or "cloud" computing network. Edge computers are typically associated with content delivery network services. For example, an edge computer can act as a "reverse proxy," acting as a buffer between a computer network and the Internet, and can be useful for DDoS mitigation, among other functions.

After receiving the token from the resource provider, the edge computer can forward the token to a gateway computer. The gateway computer can identify a data item, comprising two ciphertexts associated with the token in a database or token vault. The first ciphertext can comprise an encrypted credential (e.g., a PAN). The second ciphertext can comprise an encrypted cryptographic key. The first ciphertext can be decrypted using the cryptographic key from the second ciphertext. Using a process known as "proxy-re-encryption," the edge computer and the gateway computer can work together to re-encrypt the second ciphertext, decrypt the second ciphertext, then decrypt the first ciphertext. The decrypted first ciphertext (i.e., the credential) can then be sent by the gateway computer to the authorizing entity computer for authorization.

As an example, an online merchant may provide a service to a customer, such as a subscription-based video streaming service. Rather than storing the customer's credential on their servers, the merchant may store a token. When the customer is to be billed for the service (e.g., at the start of the month), the merchant may send the token to a gateway computer (such as a CyberSource server) for processing, via an edge computer. The gateway computer may identify a data item comprising two ciphertexts associated with the token in a token vault. The gateway computer and edge computer may then work together to decrypt the first and second ciphertext to retrieve a PAN associated with the customer. The gateway computer can then transmit the PAN to an issuer bank (authorizing entity computer) for payment authorization. The issuer bank can then approve the payment and pay the merchant, and the customer can continue using the service.

Gateway agnostic tokenization may also encompass other methods and systems, associated with, for example, generating and provisioning tokens, ciphertexts, and cryptographic keys before the system is used to route tokens, detokenize tokens, or authorize resource exchange interactions.

One embodiment is directed to a method comprising: receiving, by a gateway computer, a token from an edge computer during an interaction between a resource provider computer and a user device, wherein the resource provider computer transmits the token to the edge computer; determining, by the gateway computer, a data item comprising a first ciphertext and a second ciphertext associated with the token in a database; transmitting, by the gateway computer, the second ciphertext to the edge computer, wherein the edge computer produces a re-encrypted second ciphertext by re-encrypting the second ciphertext; receiving, by the gateway computer, the re-encrypted second ciphertext from the edge computer; decrypting, by the gateway computer, the re-encrypted second ciphertext with a gateway computer private key to obtain a cryptographic key; decrypting, by the gateway computer, the first ciphertext with the cryptographic key to obtain a credential; and transmitting, by the gateway computer, the credential to an authorizing entity computer, wherein the authorizing entity computer determines whether or not to authorize the interaction.

Another embodiment is directed to a gateway computer comprising: a processor; and a non-transitory computer readable medium coupled to the processor, the non-transitory computer readable medium comprising code, executable by the processor for implementing the above-noted method.

Another embodiment is directed to a method comprising: receiving, by an edge computer, from a resource provider computer, a token as part of an interaction between the resource provider computer and a user device; identifying, by the edge computer, based on the token, a gateway computer; transmitting, by the edge computer, to the gateway computer, the token, wherein the gateway computer identifies a data item comprising a first ciphertext and a second ciphertext corresponding to the token in a database; receiving, by the edge computer, from the gateway computer, the second ciphertext; producing, by the edge computer, a re-encrypted second ciphertext by re-encrypting the second ciphertext using a re-encryption key; and transmitting, by the edge computer, to the gateway computer, the re-encrypted second ciphertext, wherein the gateway computer produces a cryptographic key by decrypting the re-encrypted second ciphertext using a gateway computer private key, produces a credential by decrypting the first ciphertext using the cryptographic key, and transmits the credential to an authorizing entity computer, wherein the authorizing entity computer determines whether or not to authorize the interaction.

Terms

A "server computer" may include a powerful computer or cluster of computers. For example, a server computer can be a large mainframe, a minicomputer cluster, or a group of servers functioning as a unit. As an example, a server computer may be a database server coupled to a web server. The server computer may comprise one or more computational apparatuses and may use any of a variety of computing structures, arrangements, and compilations for servicing the requests from one or more client computers.

A "memory" may include any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "user" may include a person or thing that employs some other thing for some purpose. A user may include an individual that may be associated with one or more personal accounts and/or user devices. The user may also be referred to as a cardholder, account holder, or consumer in some embodiments.

A "communication device" may include any suitable device that may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of communication devices include desktop computers, videogame consoles, mobile phones (e.g., cellular phones), PDAs, tablet computers, net books, laptop computers, personal music players, hand-held specialized readers, smart cards, etc. Further examples of communication devices include wearable devices, such as smart watches, fitness bands, ankle bracelets, rings, earrings, etc., as well as vehicles with remote or direct communication capabilities. A communication device operated by a user may be referred to as a "user device."

A "resource" may include anything that may be used by an entity or transferred between entities. Examples of resources include goods, services, information, and/or access to restricted locations.

A "resource provider" may include any entity that can provide resources. Examples of resource providers include merchants, governmental agencies, etc. A resource provider may operate a resource provider computer.

An "interaction" may include any reciprocal action, effect, or influence. For example, an interaction could be an exchange or transaction between two or more parties, such as a resource provider and a user. An interaction with a resource provider that involves the transfer of a resource may be referred to as a "resource exchange interaction."

"Interaction data" may include any data pertaining to an interaction. For example, interaction data may include data relating to when the interaction took place (e.g., a timestamp) or any values associated with the interaction (e.g., the price associated with a sale).

A "credential" may include anything that indicates or proves an entity's identity. A credential may include, for example, an alphanumeric sequence, such as a payment account number (PAN) or a social security number (SSN). A credential may be used to authorize an interaction, such as a resource exchange interaction between a user associated with the credential and a merchant resource provider.

A "token" may include any substitute for a real credential. A token can be used to access a resource or in an interaction between two entities. A token may include a series of alphanumeric characters that may be used as a substitute for a payment account number (PAN). For example, a token "4900 0000 0000 0001" may be used in place of a PAN "4147 0900 0000 1234." A token may be "format preserving" and may have a numeric format that conforms to the account identifiers used in existing transaction processing networks (e.g., ISO 8583 financial transaction message format). In another example, a token may comprise a hash measurement (alternatively "hash") of a data item. The data item can be include a first ciphertext C1 (e.g., an encrypted credential) and a second ciphertext C2 (e.g., a key that can be used to decrypt the encrypted credential).

"Tokenization" may include any process by which data is replaced with substitute data. For example, a PAN may be tokenized by replacing the PAN with a substitute data (e.g., a token) that may be associated with the PAN. Further, tokenization may be applied to any other information that may be replaced with a substitute value.

"Token exchange" or "detokenization" may include any process of restoring the data that was substituted during tokenization. For example, a token exchange may include replacing a payment token with a corresponding PAN that was associated with the payment token during tokenization of the PAN. Thus, the de-tokenization may refer to the process of redeeming a token for the associated PAN value based on a token-to-PAN mapping stored, for example, in a token vault. The ability to retrieve a PAN in exchange for the associated token may be restricted to specifically authorized entities, individuals, applications, or systems. Further, de-tokenization or token exchange may be applied to any other information. In some embodiments, token exchange may be achieved via a transactional message, such as an ISO message, an application programming interface (API), or another type of web interface (e.g., web request).

A "token vault" or "token database" may include any appropriate hardware or data structure for storing tokens. Tokens in a token database may be stored in association with other data. For example, a token in a token database may be stored in association with a credential the token substitutes, or may be stored in association with an identifier for an entity with which the token is associated (i.e., a user identifier of a user of the token).

A "token server computer" may include any computer that that provides or services tokens. A token server computer may facilitate requesting, determining (e.g., generating) and/or issuing tokens, as well as maintaining an established mapping of tokens to credentials such as primary account numbers (PANs) in a repository (e.g., a token vault). Token server computers may establish token assurances level for tokens to indicate the confidence level of the token to PAN binding.

An "authorization request message" may include any electronic message that requests authorization for an interaction. In some embodiments, an authorization request message can be sent to an authorization computer and/or an issuer of a payment card to request authorization for a transaction. According to some embodiments, an authorization request message may comply with ISO 8583, a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" or "user information" including, by way of example only: a service code, a CVV (card verification value), a dCVV (dynamic card verification value), a PAN (primary account number or "account number"), an access token, a user identifier (e.g., user name), an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in identifying and/or determining whether to authorize a transaction.

An "authorization response message" may include any message that responds to an authorization request. In some cases, it may be an electronic message reply to an authorization request message generated by an issuing financial institution or an authorization computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

A "cryptographic key" may include any data used to encrypt or decrypt data. A cryptographic key may be used to encrypt plaintext data to produce ciphertext data, or decrypt ciphertext data to produce plaintext data. A cryptographic key may be symmetrical, meaning that the same cryptographic key used to encrypt data can be used to decrypt encrypted data. A cryptographic key may also be asymmetrical and part of a "cryptographic key pair." With a cryptographic key pair, data encrypted using one cryptographic key may be decrypted with the other cryptographic key, and vis-versa. Typically, one cryptographic key of an asymmetric key pair is referred to as the "public key," and the other cryptographic key is referred to as the "private key" or "secret key."

"Plaintext" may include any data that can be interpreted by a human or machine without decryption. One example of plaintext is a string, such as "hello world." A PAN is another example of plaintext. Plaintext may be encrypted using a cryptographic key in order to produce ciphertext.

"Ciphertext" may include any data that cannot be interpreted by a human or machine without decryption. Ciphertext may comprise encrypted plaintext. Ciphertext may be decrypted with a cryptographic key in order to produce the corresponding plaintext.

A "proxy" may include an entity that acts on behalf of other entities. As an example, a proxy computer may request data from a server computer on behalf of a client computer.

"Proxy re-encryption" may include any cryptographic activities involving the re-encryption of data performed by a proxy. For example, a first computer may encrypt data and transmit it to a proxy computer. The proxy computer may re-encrypt the data such that it may be decrypted using a cryptographic key belonging to a second computer. Proxy re-encryption may be performed using a "re-encryption key."

A "re-encryption key" may include any cryptographic key used to re-encrypt data. A re-encryption key may be used in a proxy re-encryption scheme to enable a proxy to re-encrypt data encrypted using one cryptographic key, such that it can be decrypted using a different cryptographic key.

A "hash function" may include any function that can be used to map data values to different data values. A hash function may map data of arbitrary size or length to data of fixed size or length. The output of a hash function may be referred to as a "hash" or a "hash measurement." A hash measurement can be used as a substitute for the data that it maps. A hash measurement can also be used to check the integrity of data.

A "data item" may include any set of data. A data item may include multiple data elements. For example, a data item corresponding to a human subject may comprise data corresponding to the subject's height, weight, and age. A data item, or data elements comprising the data item may be in encrypted or unencrypted form.

A "gateway computer" may include any computer that allows for communication between one or more computers and one or more other computers. A gateway computer may route communications from a sender computer to an appropriate receiver computer. A gateway computer may use cryptographic protocols to establish a secure communication channel between sender computers and receiver computers. A gateway computer may enable communication between resource provider computers and authorizing entity computers for the purpose of authorizing interactions.

An "edge computer" may include any computer in an edge computing network or cloud computing network. An edge computer may perform computation, provide storage, and service requests for client computers. Typically, an edge computer within a computer network (such as the Internet) is relatively close to client computers. The use of edge computers may improve latency and reduce bandwidth usage. In some embodiments, the edge computer may be a server computer in a content delivery network system such as one operated by a company such as Akamai™ or Cloudflare™.

DETAILED DESCRIPTION

Figure 1:
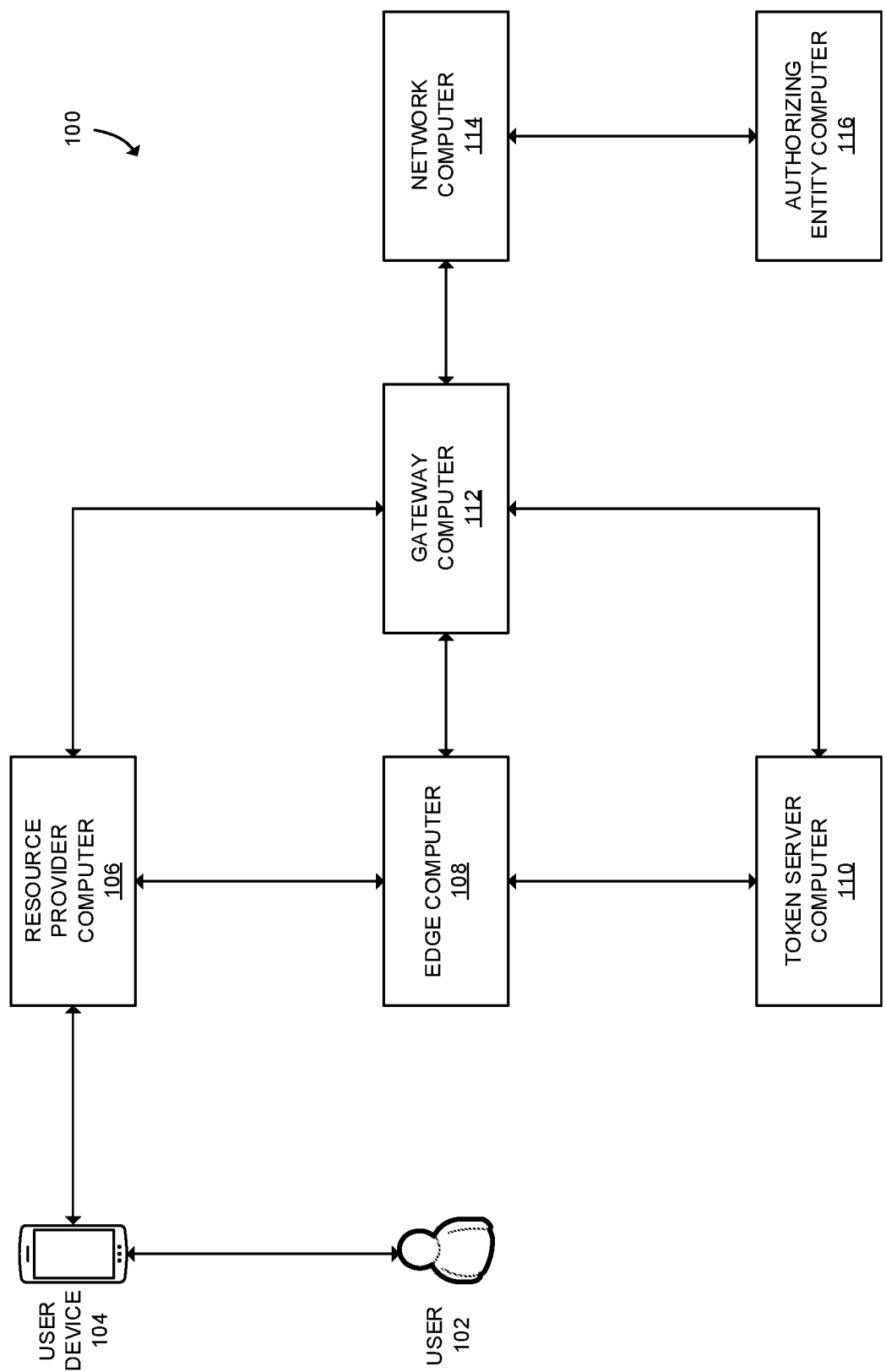
FIG. 1 shows a system block diagram of an exemplary resource exchange authorizing network according to some embodiments.

Methods of gateway agnostic tokenization can include at least three phases: A key setup phase, a token provisioning phase, and an interaction phase. The key setup phase and the token provisioning phase enable tokens to be used during the interaction phase (e.g., as described above in the summary).

The key setup phase is described in further detail below, with reference to FIGS. 5-6. To generally summarize, the key setup phase involves a gateway computer and a token server computer generating a gateway key pair and a token server key pair respectively. These key pairs can each comprise a public key (PK) and a private key (SK). The gateway computer can transmit a gateway public key $PK_G$ to the token server computer. The token server computer can use the gateway public key $PK_G$ and the token server private key $SK_B$ to generate a re-encryption key $RK_{B \rightarrow G}$.

A re-encryption key is a cryptographic key used in a proxy re-encryption scheme. A re-encryption key allows data encrypted using a first cryptographic key to be re-encrypted using a second cryptographic key, without first decrypting the data. Typically, data encrypted using the token server public key $PK_B$, can only be decrypted using the token server private key $SK_B$. However, using the re-encryption key $RK_{B \rightarrow G}$, data encrypted using the token server public key $PK_B$ can be re-encrypted using the re-encryption key $RK_{B \rightarrow G}$ and decrypted using the gateway private key $SK_G$. After the re-encryption key $RK_{B \rightarrow G}$ is generated, the re-encryption key $RK_{B \to G}$ can be distributed to an edge computer. The edge computer can use the re-encryption key $RK_{B \to G}$ during the interaction phase to re-encrypt the second ciphertext C2 (thereby creating a re-encrypted second ciphertext C2') such that it can be decrypted by the gateway computer (described in further detail below).

The token provisioning phase is described in more detail below with reference to FIGS. 7-8. The token provision phase can involve generating a data item T comprising a first ciphertext C1 and a second ciphertext C2 based on a credential, and a token H(T) based on the data item T. The token H(T) may comprise a hash measurement (alternatively "hash") of the data item T. The token H(T) can serve as a substitute for the credential during an interaction phase. As an example, the interaction phase may comprise a sale between a merchant resource provider and a consumer. The token H(T) may be provided in lieu of a traditional payment credential such as a PAN.

The first ciphertext C1 may comprise the credential encrypted using a cryptographic key DEK. The second ciphertext C2 may comprise the cryptographic key DEK encrypted using the token server public key $PK_B$. The credential can be retrieved by first decrypting the second ciphertext C2 to retrieve the cryptographic key DEK, then decrypting the first ciphertext C1 using the cryptographic key DEK to retrieve the credential.

In the token provisioning phase, the credential is first received at the token server computer. The token server computer can then generates the cryptographic key DEK and produces the first ciphertext C1 by encrypting the credential using the cryptographic key DEK. The token server computer can then produce the second ciphertext C2 by encrypting DEK using the token server public key $PK_B$. The token server computer can then transmit the data item T (comprising the first and second ciphertexts) to the gateway computer. The gateway computer can generate a token (e.g., a hash measurement) H(T) of the data item T. The gateway computer can store the data item T in a database or token vault in association with the token H(T). The gateway computer can then transmit the token H(T) to a resource provider computer that may store the token H(T) for later use.

In the interaction phase, described in further detail below with reference to FIGS. 9-10, the token H(T) can be used in order to retrieve the credential and authorize an interaction (e.g., a sale) between the resource provider computer and a user device (e.g., a smartphone, tablet, laptop, desktop computer, etc., associated with a user). During the interaction, the resource provider computer may transmit the token H(T) to an edge computer. The edge computer can identify a gateway computer associated with the token H(T), then transmit the token H(T) to the gateway computer. The gateway computer can identify and retrieve the data item T corresponding to token H(T) from the database (alternatively referred to as a "token vault"). The gateway computer can transmit the data item T to the edge computer. The edge computer can use the re-encryption key $RK_{B \to G}$ (received during the key setup phase) to re-encrypt the second ciphertext C2 to produce a re-encrypted second ciphertext C2'. The edge computer can then transmit the data item T comprising the first ciphertext C1 and the re-encrypted second ciphertext C2' back to the gateway computer. The gateway computer can then use the gateway computer private key $SK_G$ to decrypt the re-encrypted second ciphertext C2', producing the cryptographic key DEK in the process. Using the cryptographic key DEK, the gateway computer can decrypt the first ciphertext C1 to produce the credential (e.g., PAN). The gateway computer can then forward the credential to an authorizing entity computer for authorization.

Embodiments provide several advantages. For example, embodiments can leverage existing content delivery networks (edge computers) to route tokens via any gateway computer. Many resource providers, gateways, and tokenization servers use content delivery networks for their security services (e.g., DDoS mitigation, reverse proxy services, etc.) By performing proxy re-encryption at the edge computer, embodiments remove the need for specific communication channels between each tokenization server and each gateway computer. Further, the use of existing infrastructure in a novel way reduces the integration burden on resource providers, gateway computers, and token servers.

Additionally, embodiments use proxy re-encryption in order to further secure sensitive data. Credentials or other sensitive data are not available to edger computers in the form of content delivery networks (such as Akamai or Cloudflare) in unencrypted form. Sensitive credentials stay in tokenized form up until the point where they are de-tokenized and sent to the authorizing entity for authorization. Aside from the security benefits, this feature also reduces compliance requirements for the edge computers (such as PCI compliance requirements). Further, the tokenization server does not need to be invoked or otherwise communicated with during the detokenization process, improving the overall speed of resource exchange interaction authorization.

Embodiments can be used in the context of payment transactions, and many of the examples below describe such embodiments. However, embodiments of the invention are not limited thereto. For example, in embodiments of the invention, instead of the credential being a payment token and an authorizing entity computer being an issuer computer operated by an issuer of a bank account, the credential that is used may be a password that can be used to access a Website or secure data and the authorizing entity may be a computer that allows access to secure data upon receipt of the password.

An exemplary system according to embodiments is described below with reference to FIG. 1. An exemplary gateway computer is described below with reference to FIG. 2. An exemplary edge computer is described below with reference to FIG. 3. Proxy re-encryption is summarized below with reference to FIG. 4. The key setup phase is described below with reference to the flowchart of FIG. 5 and the sequence diagram of FIG. 6. The token provisioning phase is described below with reference to the flowchart of FIG. 7 and the sequence/system diagram of FIG. 8. The interaction phase is described below with reference to the flowchart of FIG. 9 and the sequence/system diagram of FIG. 10.

FIG. 1 shows a block diagram of an exemplary resource exchange system 100 according to some embodiments. The system 100 can comprise a user 102 operating a user device 104, which interacts with a resource provider computer 106. The resource provider computer 108 can interact with an edge computer 108. The edge computer can interact with a token server computer 110, and a gateway computer 112. The gateway computer 112 can be in communication with a network computer 114 and an authorizing entity computer 116.

Although only a single instance of each computer or entity is shown in FIG. 1, some embodiments may have one or more users 102, user devices 104, resource provider computers 106, edge computers 108, token server computers 110, gateway computers 112, network computers 114, and authorizing entity computers 116. One advantage of gateway agnostic tokenization is that it can enable a resource provider computer 106 to route tokens or credentials to an appropriate authorizing entity computer 116 via any gateway computer 112 of a number of gateway computers.

The computers and devices of FIG. 1 may communicate with each other via a communication network, which can take any suitable form, and may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the participant computers may be transmitted using a secure communications protocol, such as, but not limited to, File Transfer Protocol (FTP); HyperText Transfer Protocol (HTTP); Secure HyperText Transfer Protocol (HTTPS); Secure Socket Layer (SSL), ISO (e.g., ISO 8583) and/or the like.

The user 102 may comprise a human or machine user of user device 104. User 102 may use user device 104 for the purpose of performing a resource exchange interaction with resource provider computer 106. As an example, user 102 (e.g., a consumer) may use user device 104 (e.g., a smart phone) in order to purchase a good or service from a resource provider computer 106 associated with an online merchant. User 102 may interact with user device 104 via any appropriate input/output (I/O) device, such as a keyboard, mouse, buttons, touchscreen, microphone, speakers, etc. These I/O devices may be integrated into user device 104.

User device 104 may comprise any appropriate communication device as defined in the terms section. Examples of user devices 104 include desktop computers, videogame consoles, mobile phones (e.g., cellular phones), PDAs, tablet computers, net books, laptop computers, personal music players, hand-held specialized readers, smart cards, etc. Further examples of communication devices include wearable devices, such as smart watches, fitness bands, ankle bracelets, rings, earrings, etc. User device 104 may possess communication capabilities that enable it to communicate with resource provider computer 106. For example, user device 104 may communicate with resource provider computer 106 via a network such as a local area network or the Internet. Alternatively, user device 104 may communicate with the resource provider computer 106 via a medium such as near-field communication (NFC).

In some embodiments, user device 104 may store tokens in its memory and transmit one or more tokens to resource provider computer 106 as part of an interaction between user 102 and resource provider computer 106. However, in other embodiments, resource provider computer 106 may store tokens in a database, and user device 104 may not transmit tokens to resource provider computer 106.

As a first example, a user 102 may use user device 104 to purchase goods or services at an online merchant. User 102 may use user device 104 and a web browser to navigate to a website associated with the online merchant. This website may be hosted by resource provider computer 106. User 102 may complete their shopping and navigate to a checkout webpage, at which point user 102 has an opportunity to provide a payment credential (e.g., a PAN or a token). User 102 may choose to provide a token stored on user device 104, and user device 104 may transmit that token to resource provider computer 106.

As a second example, a user 102 may use user device 104 to view movies, television shows, or other videos on an online streaming platform, hosted by resource provider computer 106. User 102 may pay the resource provider for this service on a monthly basis. Rather than storing user's 102 payment credential at the resource provider computer 106, the resource provider computer 106 may instead store a token. In this case, a token may not necessarily be transferred from user device 104 to resource provider computer 106 during an interaction between resource provider computer 106 and user device 104 or user 102.

Resource provider computer 106 may comprise a computer or server associated with a resource provider. As defined above, a resource provider may comprise any entity that provides a resource (e.g., a good or service) to users such as user 102, including, for example, commercial businesses and governments. A resource provider may use resource provider computer 106 in order to provide these resources, or in order to perform or automate resource exchange interactions with users. For example, resource provider computer 106 may comprise a web server that hosts an e-commerce website. Resource provider computer 106 may communicate with edge computer 108 or gateway computer 112 via any appropriate communication network such as the Internet. Resource provider computer 106 may transmit tokens and authorization request messages comprising tokens to edge computer 108 during an interaction phase (e.g., during a sale to user 102). Resource provider computer 106 may also transmit non-token credential to edge computer 108 or gateway computer 112 during a token provisioning phase.

Edge computer 108 may comprise a computer in an edge computing network or a cloud computing network. Edge computer 108 may be relatively close (e.g., in geographic distance or network distance) to resource provider computer 106, thereby reducing latency. Edge computer 108 may perform computations or cryptographic operations in order to enable detokenization of a token received from resource provider computer 106. Notably, edge computer 108 may perform operations associated with proxy re-encryption. Edge computer 108 may be better understood with reference to FIG. 3 and edge computer 300.

Figure 3:
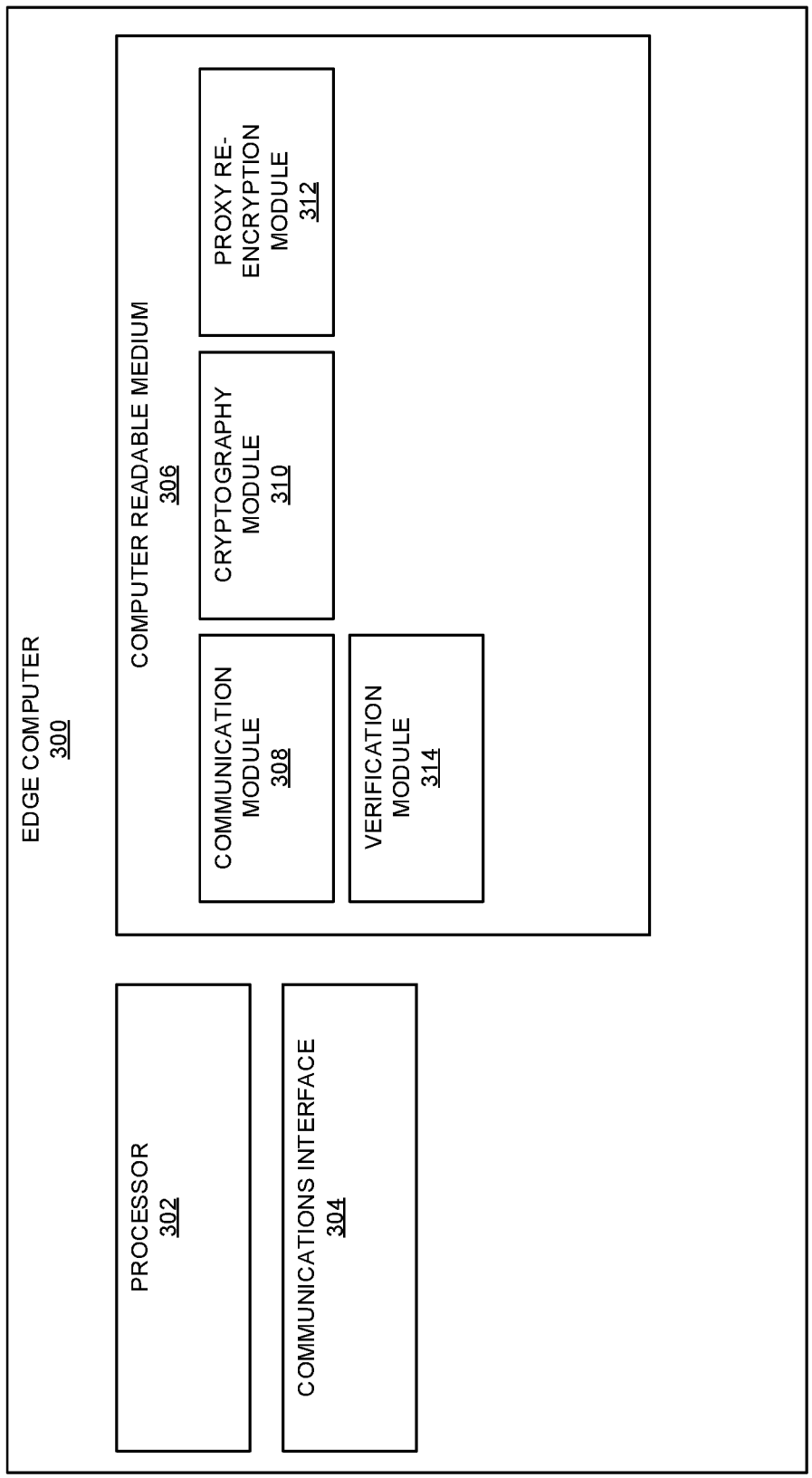
FIG. 3 shows a system block diagram of an exemplary edge computer according to some embodiments.

FIG. 3 shows a system block diagram of an edge computer 300 according to some embodiments. Edge computer 300 may comprise a processor 302, a communications interface 304, a computer readable medium 306. The computer readable medium 306 may store a number of software modules, including, among others, a communication module 308, a cryptography module 310, a proxy re-encryption module 312, and a verification module 314.

Processor 302 may comprise any suitable processing apparatus or device as described above. The communications interface 304 may comprise a network interface (e.g., an Ethernet interface, wireless network card, etc.) that enables edge computer 300 to communicate with other computers (e.g., the resource provider computer, the token server computer, and the gateway computer) or systems over a network such as the Internet. Computer readable medium 306 may comprise any hardware capable of storing data that edge computer 300 can read or write using processor 302. As an example, computer readable medium 306 may comprise a hard disk drive (HDD) solid state drive (SSD), RAM, etc., or any combination thereof.

In some embodiments, the computer readable medium 306 may comprise code, executable by the processor 302, for performing a method comprising: receiving, from a resource provider computer, a token as part of an interaction between the resource provider computer and a user device; identifying, based on the token, a gateway computer; transmitting, to the gateway computer, the token, wherein the gateway computer identifies a data item comprising a first ciphertext and a second ciphertext corresponding to the token in a database; receiving, from the gateway computer, the second ciphertext; producing a re-encrypted second ciphertext by re-encrypting the second ciphertext using a re-encryption key; and transmitting, to the gateway computer, the re-encrypted second ciphertext, wherein the gateway computer produces a cryptographic key by decrypting the re-encrypted second ciphertext using a gateway computer private key, produces a credential by decrypting the first ciphertext using the cryptographic key, and transmits the credential to an authorizing entity computer, wherein the authorizing entity computer determines whether or not to authorize the interaction.

Communication module 308 may comprise code or instructions that cause or enable processor 302 to generate data, reformat data, transmit data, receive data, and/or otherwise communicate with other entities or computers. This may include, for example, one or more of the following: receiving tokens as part of interactions between resource providers and users or user devices, transmitting tokens to gateway computers, receiving ciphertexts from gateway computers, receiving data items comprising multiple (e.g., two) ciphertexts from gateway computers, transmitting re-encrypted ciphertexts (e.g., the re-encrypted second ciphertext C2') to gateway computers, receiving cryptographic keys from the gateway computer or token server computer (e.g., the re-encryption key $RK_{B \rightarrow G}$), and receiving a "server-less" function from a token server computer or a gateway computer. Additionally, communication module 308 may enable edge computer 300 to communicate over a network using any appropriate communication protocol, such as TCP, UDP, etc.

Cryptography module 310 may comprise code or instructions that enable processor 302 to perform any operations associated with cryptography. This may include, for example, generating and storing cryptographic keys, using cryptographic keys to decrypt or encrypt data, or the like. Cryptography module 310 may comprise code enabling processor 302 to implement a particular cryptosystem, such as the advanced encryption standard (AES), elliptic curve cryptography, etc.

Proxy re-encryption module 312 may comprise code or instructions that enable processor 302 to perform any operations associated with proxy re-encryption or otherwise implement a proxy re-encryption scheme. In some embodiments, proxy re-encryption module 312 and cryptography module 310 may comprise a single software module. Proxy re-encryption module 312 may enable edge computer 300 to store one or more re-encryption keys (e.g., re-encryption key $RK_{B \rightarrow G}$) and use re-encryption keys to re-encrypt ciphertext (e.g., second ciphertext C2) to produce re-encrypted ciphertexts (e.g., re-encrypted second ciphertext C2').

In some embodiments, the resource exchange interaction system (i.e., system 100 in FIG. 1) may comprise multiple gateway computers and multiple re-encryption keys corresponding to those gateway computers. In these embodiments, proxy re-encryption module 312 may comprise code enabling processor 302 to identify a gateway computer corresponding to a particular token, data item, or ciphertext. The edge computer may identify the gateway computer by determining a gateway identifier associated with the gateway computer based on the token, data item or ciphertext. Further, edge computer 300 can use proxy re-encryption module 312 to determine a re-encryption key corresponding to that gateway computer and gateway computer identifier, such that a re-encrypted ciphertext produced by edge computer 300 using the re-encryption key (e.g., the re-encrypted second ciphertext C2') can be decrypted by the corresponding gateway computer. The proxy re-encryption module 312 may use the gateway identifier to determine a re-encryption key corresponding to the gateway identifier, for example, using a lookup table comprising a plurality of gateway identifiers and a corresponding plurality of re-encryption keys.

In some embodiments, the proxy re-encryption module 312 may comprise a "server-less function." That is, the server-less function may comprise some or all of the code enabling the processor 302 to perform the functions described above. The server-less function may be so called because it enables detokenization without the use of a token server computer (e.g., token server computer 110 from FIG. 1). The server-less function may be received from either the token server computer or the gateway computer.

The verification module 314 may comprise code or instructions, executable by processor 302 for verifying the integrity of data items. This may comprise, for example, generating hash measurements of data items and comparing those hash measurements to a known hash measurement. As an example, a token H(T), received from a resource provider computer 106 may comprise a hash measurement of a data item T. During an interaction phase, edge computer 300 may transmit the token H(T) to the gateway computer, and receive data item T from the gateway computer. Edge computer 300 may use verification module 314 to generate a hash measurement of the data item H'(T) and compare H'(T) to the token H(T). If H'(T) is the same as the token H(T), the correct data item T was retrieved by the gateway computer and the detokenization process can continue, otherwise edge computer 300 may choose to terminate the detokenization process.

Returning to FIG. 1, token server computer 110 may comprise a server computer that prepares ciphertexts and cryptographic keys during the key generation phase and token provisioning phase. The token server computer 110 may generate or create re-encryption keys used by edge computer 108 in proxy re-encryption, and may transmit these re-encryption keys to edge computer 108. Additionally, token server computer 110 may use a credential to generate a data item T comprising two ciphertexts C1 and C2. Token server computer 110 may transmit this data item T to gateway computer 112.

In some embodiments, token server computer 110 may be associated with authorizing entity computer 116. As an example, token server computer 110 may be owned or operated by the authorizing entity that operates authorizing entity computer 116. The authorizing entity may comprise an issuer bank that issued the credential to user 102.

Gateway computer 112 may comprise a computer system that acts as a gateway on behalf of resource provider computer 106. Gateway computer 112 can allow resource provider computer 106 to communicate with any number of authorizing entity computers 116. This may provide convenience to resource providers, as they only need to know the identities or network addresses of a smaller number of gateway computers 112, rather than a comparatively large number of authorizing entity computers 116. In gateway agnostic tokenization, the gateway computer 112 can participate in the key setup phase, token provisioning phase, and interaction phase. Gateway computer 112 is described in further detail with reference to FIG. 2

Figure 2:
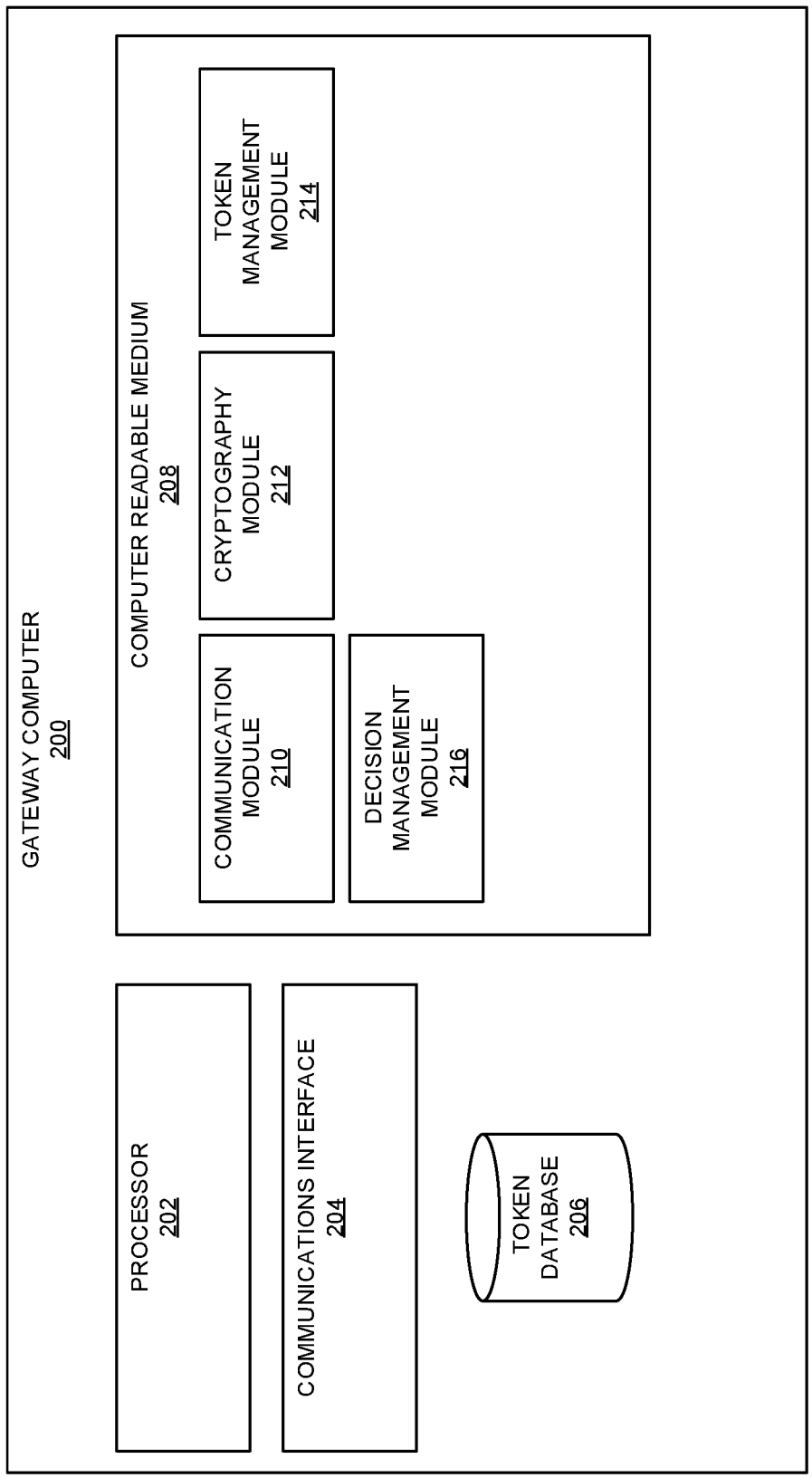
FIG. 2 shows a system block diagram of an exemplary gateway computer according to some embodiments.

FIG. 2 shows a system block diagram of a gateway computer 200 according to some embodiments. Gateway computer 200 may comprise a processor 202, a communications interface 204, a token database 206, and a computer readable medium 208. The computer readable medium 208 may store a number of software modules, including, among others, a communication module 210, a cryptography module 212, a token management module 214, and a decision management module 216.

Processor 202 may comprise any suitable processing apparatus or device as described above. Communications interface 204 may comprise a network interface (e.g., an Ethernet interface, wireless network card, etc.) that enables the gateway computer to communicate with other computers (e.g., the resource provider computer, the edge computer, and the token server computer) or systems over a network such as the Internet.

Token database 206 (also referred to as "token vault" 206) may comprise any hardware or software used to store one or more tokens and one or more data items in association with one another. These data items may each comprise a first ciphertext and a second ciphertext. In some embodiments, the tokens may comprise hash measurements of their corresponding data items. Thus in some embodiments, token database 206 may implement a hash table that maps tokens to their corresponding data items.

Computer readable medium 208 may comprise any hardware capable of storing data that gateway computer 200 can read or write using processor 202. As an example computer readable medium 208 may comprise a hard disk drive (HDD) solid state drive (SSD), RAM, etc., or any combination thereof.

In some embodiments, computer readable medium 208 may comprise code, executable by the processor 202 to implement a method comprising: receiving a token from an edge computer during an interaction between a resource provider computer and a user device, wherein the resource provider computer transmits the token to the edge computer; determining a data item comprising a first ciphertext and a second ciphertext associated with the token in a database; transmitting the second ciphertext to the edge computer, wherein the edge computer produces a re-encrypted second ciphertext by re-encrypting the second ciphertext; receiving the re-encrypted second ciphertext from the edge computer; decrypting the re-encrypted second ciphertext with a gateway computer private key to obtain a cryptographic key; decrypting the first ciphertext with the cryptographic key to obtain a credential; and transmitting the credential to an authorizing entity computer, wherein the authorizing entity computer determines whether or not to authorize the interaction.

Communication module 210 may comprise code or instructions that cause or enable processor 302 to generate data, reformat data, transmit data, receive data, and/or otherwise communicate with other entities or computers. This may include, for example, one or more of the following: receiving a token from an edge computer, transmitting ciphertexts or data items (including a first ciphertext C1 and/or a second ciphertext C2) to the edge computer, receiving re-encrypted ciphertexts from the edge computer, transmitting credentials to an authorizing entity computer, receiving interaction data from the edge computer, transmitting re-encryption keys to the edge computer, receiving data items from a token server computer, etc.

Cryptography module 212 may comprise code or instructions that enable processor 202 to perform any operations associated with cryptography. These may include, for example, generating and storing cryptographic keys, using cryptographic keys to decrypt or encrypt data, or the like. Cryptography module 212 may comprise code enabling processor 202 to implement a particular cryptosystem, such as AES, elliptic curve cryptography, etc.

Gateway computer 200 may use cryptography module 212 to decrypt ciphertexts, such as a re-encrypted second ciphertext C2' in order to obtain a cryptographic key DEK. Likewise, gateway computer 200 may use cryptography module 212 to decrypt a first ciphertext C1 using the cryptographic key DEK in order to obtain a credential.

Token management module 214 may comprise code or instructions that enable processor 202 to perform functions associated with the generation and management of tokens and any associated data. Gateway computer 200 may use token management module 214 in order to interface with token database 206, and retrieve tokens or associated data from token database 206. Gateway computer 200 may use token management module 214 to identify a data item (which may comprise a first ciphertext C1 and a second ciphertext C2) associated with a token received from an edge computer. This may be accomplished by querying token database 206 using the token. Gateway computer 200 may also use token management module 214 to generate tokens, for example, by generating a token H(T) based on a hash measurement of a corresponding data item T. Gateway computer 200 may use the token management module 214 to store generated tokens in token database 206 in association with their corresponding data item.

Decision management module 216 (also referred to as "decision manager") may comprise code or instructions, executable by the processor 202, for making decisions associated with the authorization of interactions. The decision management module 216 can, for example, be used to determine whether or not a given interaction is legitimate or fraudulent. If gateway computer 200 determines that an interaction is likely fraudulent, the gateway computer 200 may decide not to transmit the credential to the authorizing entity computer for authorization. Gateway computer 200 may use the decision management module 216 to evaluate an interaction based on interaction data and the credential. As described above, interaction data may refer to data associated with an interaction, such as the time at which the interaction took place, the location where an interaction took place, etc. For example, for a transaction interaction, a specific user may use their PAN (credential) primarily between the hours of 12:00 P.M. and 3:00 P.M., and authorization requests may primarily come from the United States. If a transaction takes place outside this time window (e.g., 11:30 P.M.) from a different location (e.g., Uzbekistan), decision management module 216 may flag the transaction as likely fraudulent. Decision management module 216 may use any appropriate technique to evaluate interactions, including for example, rule based systems, statistical model, machine learning, artificial intelligence, etc.

Returning to FIG. 1, network computer 114 may comprise any computer or any number of computers in a network between gateway computer 112 and authorizing entity computer 116. A credential or authorization request message from gateway computer 112 may pass through network computer 114 before being received by authorizing entity computer 116. Network computer 114 may comprise a computer system in a general purpose network, such as the Internet, or a computer system in a specialized network. For example, network computer 114 may comprise a computer in a payment processing network, such as VisaNET.

Authorizing entity computer 116 may comprise a computer associated with an authorizing entity that may be used by the authorizing entity in order to evaluate and authorize interactions. In some embodiments, authorizing entity computer 116 may be associated with an issuer bank that manages an account on behalf of user 102. Funds from the account may be used to pay for transactional interactions between user device 104 and resource provider 106. Authorizing entity computer 116 may be associated with token server computer 110, i.e., the authorizing entity may also manage, own, or operate, token server computer 110. Authorizing entity computer 116 may receive authorization request messages, approve or decline those messages, and transmits authorization response messages. These authorization request messages may comprise credential produced during detokenization.

Figure 4:
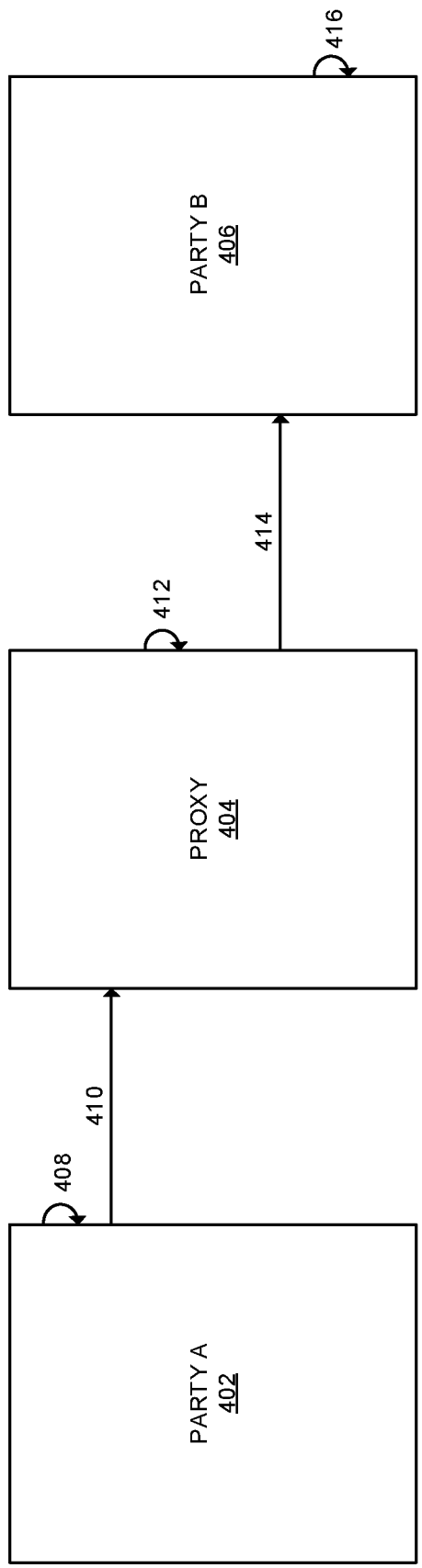
FIG. 4 shows a hybrid sequence diagram of a proxy re-encryption scheme according to some embodiments.

FIG. 4 shows a hybrid sequence diagram of a model for proxy re-encryption according to some embodiments. FIG. 4 is intended for illustrative purposes, and the description of FIG. 4 will not include many details associated with practical implementation of proxy re-encryption. Proxy re-encryption may be better understood with reference to the journal article "Improved Proxy Re-Encryption Schemes with Applications to Secure Distributed Storage" (Ateniese et al. Journal ACM Transactions on Information and System Security (TISSEC) Volume 9 Issue 1, February 2006 Pages 1-30 ACM New York, NY, USA).

In some cryptographic applications, a first party (e.g., party A 402) may want to encrypt sensitive data (e.g., a payment credential such as a PAN) before transmitting it to a second party (e.g., party B 406). However, party A 402 may not want to share a cryptographic key with party B 406 that would enable party B 406 to decrypt the encrypted data. Alternatively, there may be multiple parties B 406 (e.g., multiple gateway computers) and party A 402 may not want to distribute cryptographic keys to all parties B 406. Typically, without the corresponding cryptographic key, party B 406 would be unable to decrypt the data encrypted by party A 402.

However, proxy re-encryption allows encrypted data produced by party A 402 to be re-encrypted by proxy 404 using a re-encryption key, allowing party B 406 to decrypt the re-encrypted data using a cryptographic key known to party B 406.

Generally, the process is as follows: At step 408, party A 402 encrypts data using a cryptographic key known to party A 402 but not known to party B 410. At step 410, party A 402 transmits the encrypted data to proxy 404. At step 412, proxy 404 re-encrypts the encrypted data using a re-encryption key. The re-encryption key corresponds to a cryptographic key known to party A 402 and a cryptographic key known to party B 406. The re-encrypted data can now be decrypted by party B 406. At step 414, proxy 404 transmits the re-encrypted data to party B 406. At step 416, party B 406 decrypts the data using a cryptographic key know to party B.

In gateway agnostic tokenization, party A 402 may correspond to a token server computer (e.g., token server computer 110), proxy 404 may correspond to an edge computer (e.g., edge computer 108) and party B 406 may correspond to a gateway computer (e.g., gateway computer 112). The token server computer may encrypt the cryptographic key DEK using the token server computer public key $PK_B$ to form the second ciphertext C2. The second ciphertext C2 can be decrypted using the token server computer private key $SK_B$. However, the token server computer does not share the token server computer private key $SK_B$ with the gateway computer. Instead, the token server computer generates a re-encryption key $RK_{B \to G}$ using the token server computer private key $SK_B$ and the gateway computer public key $PK_G$. The re-encryption key $RK_{B \to G}$ can be transmitted to the edge computer, which acts as proxy 404. When the gateway computer wants to decrypt the second ciphertext C2 in order to obtain the cryptographic key DEK, the gateway computer first transmits the second ciphertext C2 to the edge computer. The edge computer then uses the re-encryption key $RK_{B \to G}$ to re-encrypt the second ciphertext to produce a re-encrypted second ciphertext C2'. The re-encrypted second ciphertext C2' can be sent by the edge computer back to the gateway computer. The gateway computer can then use the gateway computer private key $SK_B$ to decrypt the re-encrypted second ciphertext C2' and retrieve the cryptographic key DEK.

When multiple re-encryption keys are stored and used by the edge computer, proxy re-encryption enables resource exchange interaction systems to be gateway agnostic. The edge computer is able to re-encrypt a second ciphertext C2 such that it can be decrypted by any given gateway computer by using the re-encryption key corresponding to that gateway computer. If one gateway computer is offline, the edge computer can re-encrypt the second ciphertext C2 so that it may be decrypted by a different gateway computer. Provided that at least one gateway computer is functional, the use of proxy re-encryption enables resource providers to use a functional gateway computer for detokenization, whereas in a conventional system those resource providers may have been "locked in" to using one of the other, non-functional gateway computers.

Figure 5:
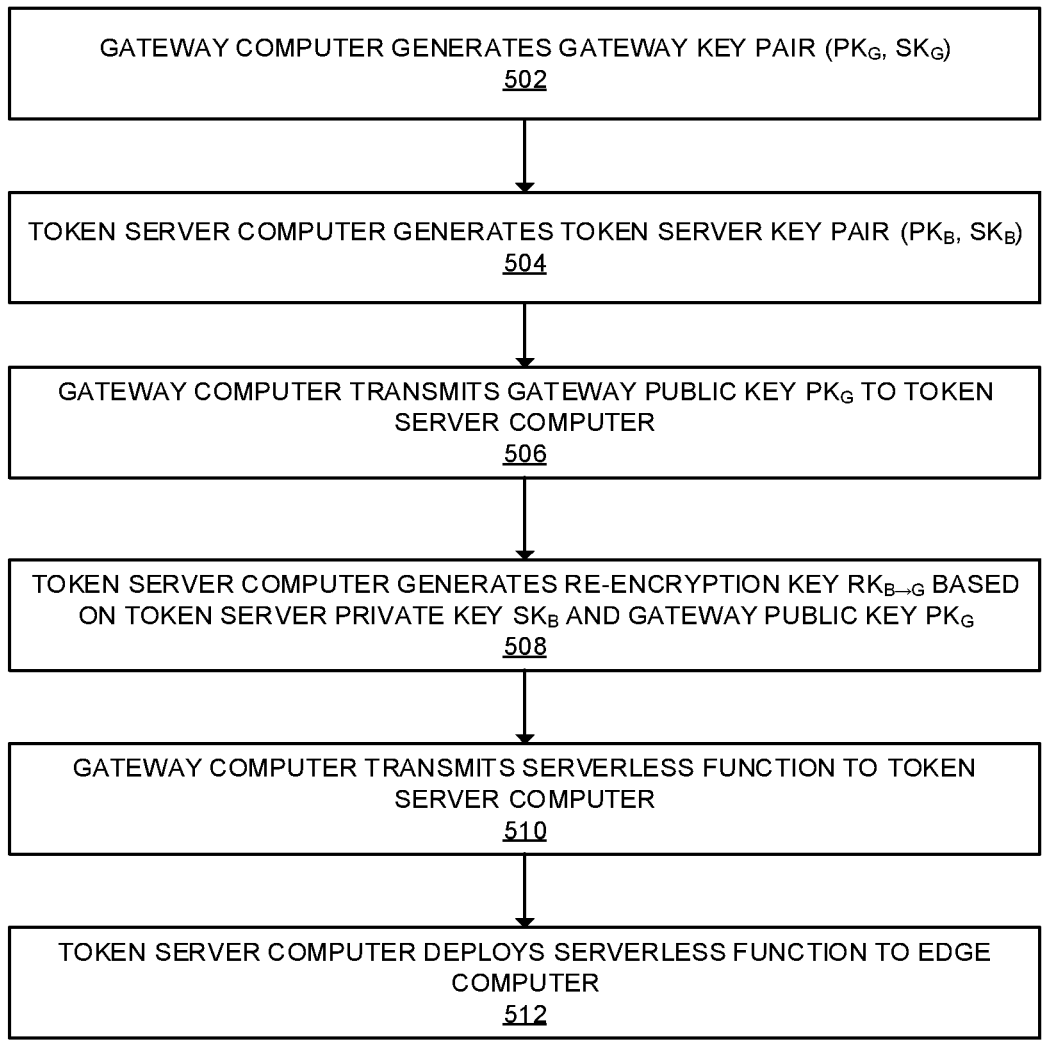
FIG. 5 shows a flowchart of an exemplary key setup phase according to some embodiments.
Figure 6:
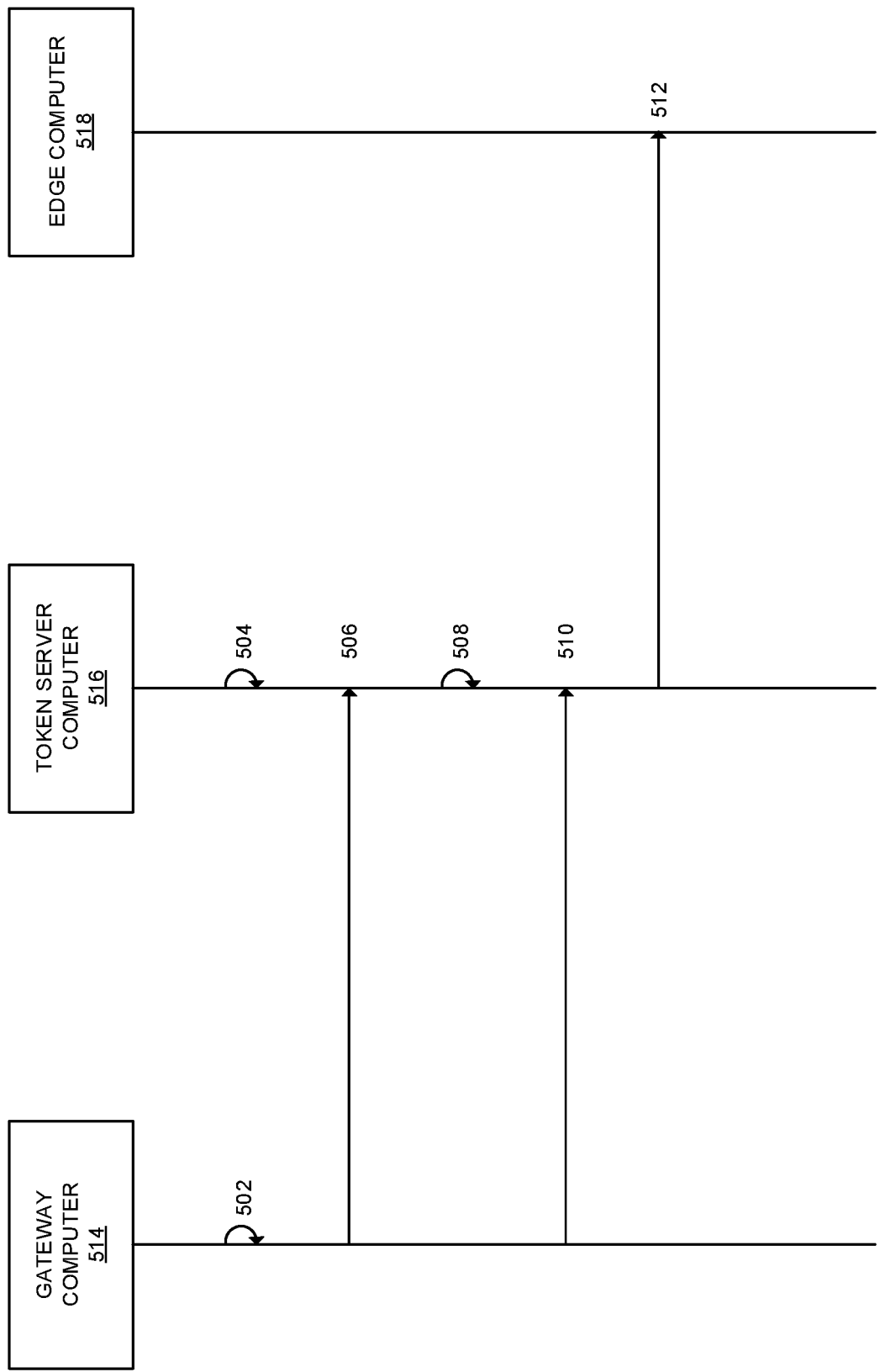
FIG. 6 shows a sequence diagram of an exemplary key setup phase according to some embodiments.

The key setup phase may be better understood with reference to the flowchart of FIG. 5 and the sequence diagram of FIG. 6. During the key setup phase, the gateway computer and token server computer generate a re-encryption key $RK_{B \to G}$ based on a token server private key $SK_B$ and a gateway public key $PK_G$. The re-encryption key $RK_{B \to G}$ is transmitted to the edge computer so that it can be used to perform proxy re-encryption during the interaction phase.

At step 502, gateway computer 514 can generate a gateway key pair ($PK_G$, $SK_G$). The gateway key pair can be an asymmetric key pair comprising a gateway public key $PK_G$ and a gateway private key $SK_G$. Data encrypted with the gateway public key $PK_G$ may be decrypted using the gateway private key $SK_G$ and vis-versa. The gateway computer 514 may generate the gateway key pair using any appropriate technique. For example, either or both the gateway public key $PK_G$ and gateway private key $SK_G$ may comprise random numbers, large prime numbers, produces of large prime numbers, etc.

At step 504, token server computer 516 can generate a token server key pair ($PK_B$, $SK_B$). The token server key pair can be an asymmetric key pair comprising a token server public key $PK_B$ and a token server private key $SK_B$. Data encrypted with the token server public key $PK_B$ may be decrypted using the token server private key $SK_B$ and vis-versa. The token server computer 516 may generate the token server key pair using any appropriate technique. For example, either or both the token server public key $PK_B$ and token server private key $SK_B$ may comprise random numbers, large prime numbers, products of large prime numbers, etc.

At step 506, gateway computer 514 can transmit the gateway public key $PK_G$ to token server computer 516. Token server computer 516 can subsequently use the gateway public key $PK_G$ to generate the re-encryption key $RK_{B \to G}$. Gateway computer 514 can transmit the gateway public key $PK_G$ to token server computer 516 in any appropriate form (e.g., encrypted or unencrypted).

At step 508, token server computer 516 can generate the re-encryption key $RK_{B \to G}$ based on the token server private key $SK_B$ and the gateway public key $PK_G$. The re-encryption key $RK_{B \to G}$ may correspond to the gateway computer 514 that provided the gateway public key $PK_G$. Token server computer 516 can generate the re-encryption key $RK_{B \to G}$ in accordance with any applicable proxy re-encryption scheme.

In some embodiments, gateway computer 514 may be one of a plurality of gateway computers. In these embodiments, steps 502, 506, and 508 may be performed by or for each gateway computer. As a result, token server computer 516 may generate a plurality of re-encryption keys $RK_{B \to G}$, each corresponding to a different gateway computer. Token server computer 516 may associate the plurality of re-encryption keys $RK_{B \to G}$ with a plurality of gateway identifiers, such that the gateway computer 514 corresponding to a particular re-encryption key $RK_{B \to G}$ can be later identified by edge computer 518.

Afterwards, one or more re-encryption keys $RK_{B \to G}$ along with one or more corresponding gateway identifiers can be transmitted by token server computer 516 to edge computer 518, so that edge computer 518 can use these re-encryption keys $RK_{B \to G}$ during an interaction phase to perform proxy re-encryption.

Some embodiments may involve edge computer 518 using a server-less function to perform proxy re-encryption. The server-less function may comprise software or a software algorithm that enables the edge computer to perform proxy re-encryption using the re-encryption key(s) $RK_{B \to G}$. The server-less function may be so called because it enables detokenization during the interaction phase without the participation of token server computer 516. The server-less function may comprise re-encryption keys $RK_{B \to G}$, gateway computer identifiers, and any code necessary to perform proxy re-encryption on ciphertexts using these re-encryption keys and gateway computer identifiers.

If a server-less function is used, at optional step 510, gateway computer 514 may transmit the server-less function to token server computer 516. Subsequently, token server computer 516 may populate the server-less function using the re-encryption key(s) $RK_{B \to G}$ generated in step 508 and any gateway identifiers. At optional step 512, token server computer 516 may transmit the populated server-less function to edge computer 518, such that it can be used during the interaction phase. Alternatively, gateway computer 514 may transmit the server-less function directly to edge computer 518, and edge computer 518 can populate the server-less function using re-encryption keys $RK_{B \to G}$ and gateway identifiers received from either gateway computer 514 or token server computer 516.

Figure 7:
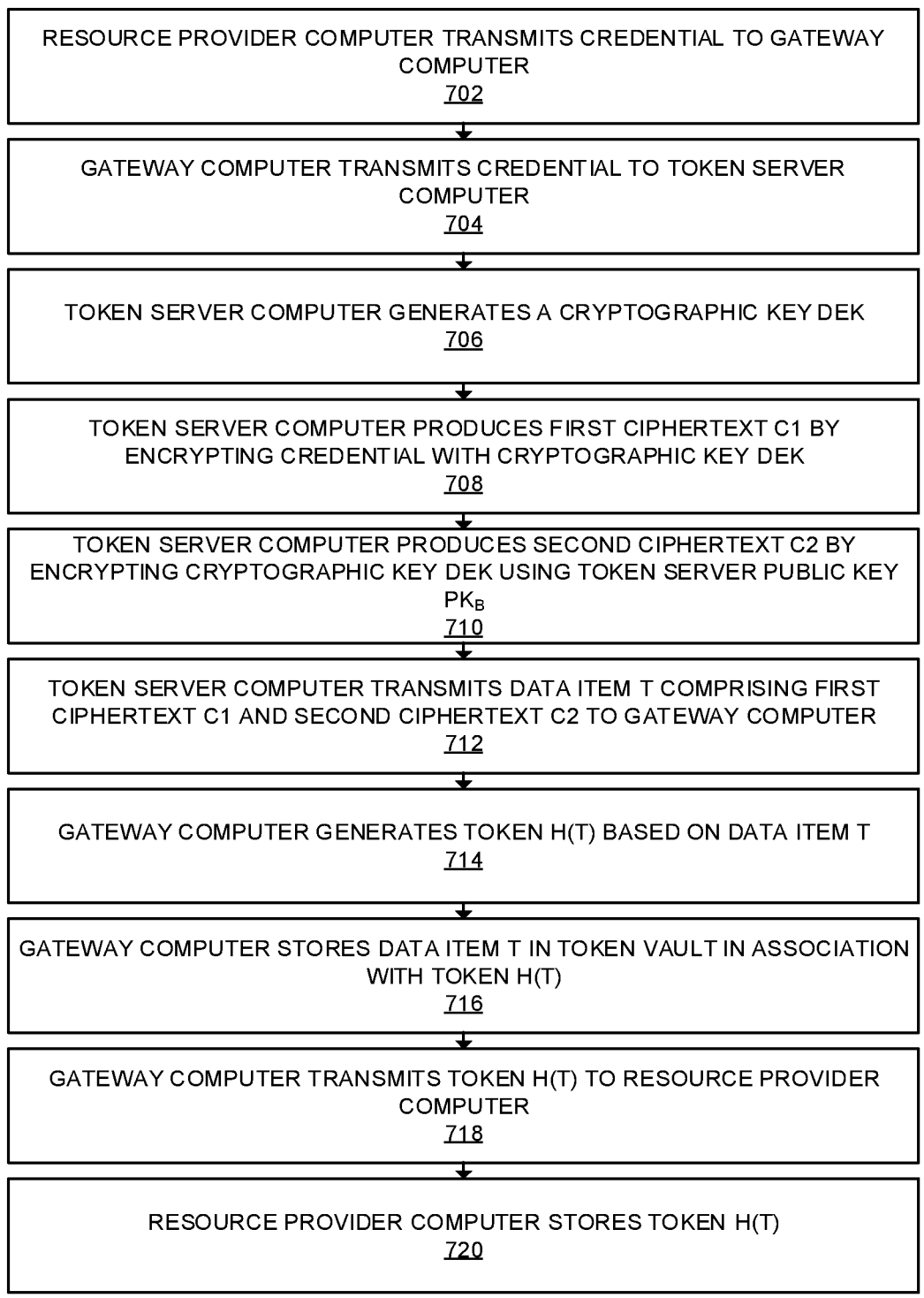
FIG. 7 shows a flowchart of an exemplary token provisioning phase according to some embodiments.
Figure 8:
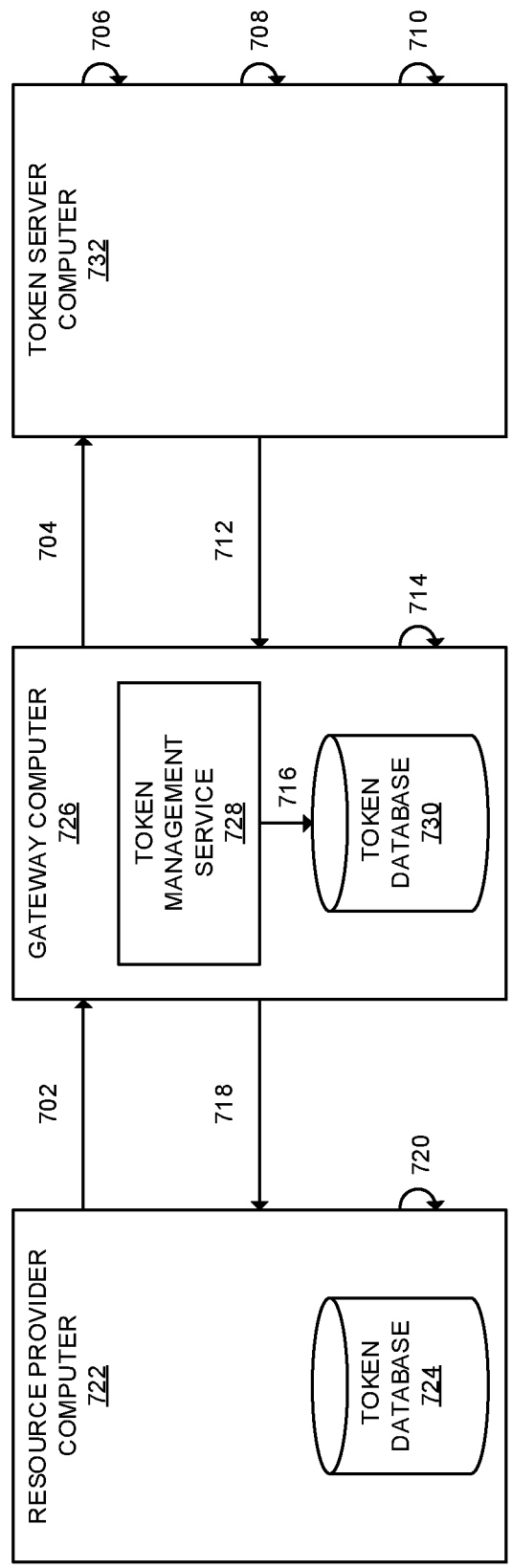
FIG. 8 shows a sequence diagram of an exemplary token provisioning phase according to some embodiments.

The token provisioning phase may be better understood with reference to the flowchart of FIG. 7 and the hybrid sequence diagram of FIG. 8. During the token provisioning phase, the token server computer can generates a cryptographic key DEK. The token server computer can use the cryptographic key DEK, a credential (e.g., a PAN), and the token server public key $PK_B$ to generate a first ciphertext C1 and a second ciphertext C2. The first ciphertext C1 and second ciphertext C2 form a data item T that the token server computer can transmit to the gateway computer. The gateway computer can generate a token H(T) based on the data item T, which the gateway computer can store in a token database in association with the data item T. The gateway computer can then provide the token H(T) to the resource provider computer, and the resource provider computer can subsequently store the token H(T).

At step 702, resource provider computer 722 can transmit a credential to gateway computer 726. Resource provider computer 722 may want this credential tokenized, so that resource provider computer 722 can store the token in its token database 724 for future interactions with a user or user device corresponding to the credential. Gateway computer 726 may receive the credential from resource provider computer 722 prior to an interaction between the resource provider computer 722 and a user device (i.e., prior to the interaction phase).

At step 704, gateway computer 726 can transmit the credential to a token server computer 732. Gateway computer 726 can transmit the credential to token server computer 732 in order for token server computer 732 to generate the data item T comprising the first ciphertext C1 and the second ciphertext C2. Gateway computer 726 may identify token server computer 732 based on the credential. For example, if the credential is a PAN corresponding to an issuing bank, gateway computer 726 may use numbers in the PAN in order to identify a token server computer 732 corresponding to that issuing bank.

At step 706, token server computer 732 can generate a cryptographic key DEK. The cryptographic key DEK may be a symmetric cryptographic key. Token server computer 732 can generate the cryptographic key DEK using any appropriate technique and according to any appropriate symmetric cryptographic system.

At step 708, token server computer 732 can produce the first ciphertext C1 by encrypting the credential using the cryptographic key DEK. By encrypting the credential using the cryptographic key DEK, the credential is protected from fraud or misuse, as an entity needs to first possess the cryptographic key DEK in order to obtain the credential.

At step 710, token server computer 732 can produce the second ciphertext C2 by encrypting the cryptographic key DEK using the token server public key $PK_B$. Because the second ciphertext C2 is encrypted using the token server public key $PK_B$, the second ciphertext can be re-encrypted using the re-encryption key $RK_{B \to G}$, such that the re-encrypted second ciphertext C2' can be decrypted by the gateway computer to retrieve the cryptographic key DEK, and subsequently decrypt the first ciphertext C1 using the cryptographic key DEK to retrieve the credential.

At step 712, token server computer 732 can transmit a data item T comprising the first ciphertext C1 and the second ciphertext C2 to gateway computer 726. Gateway computer 726 can subsequently receive the data item T.

At step 714, gateway computer 726 generates a token H(T) based on the data item T. In one embodiment, the token H(T) can comprise a hash measurement of the data item T, and gateway computer 726 can generate the token H(T) using a hash function and the data item T (e.g., a hash function such as SHA-256). Using a hash function has added benefit because it allows an edge computer to verify data items during the interaction phase by comparing the token H(T) to a hash measurement of the data item T generated by the edge computer. However, gateway computer 726 can generate the token H(T) using any appropriate means, and is not restricted to the use of hash functions.

At step 716, gateway computer 726 can store the data item T in token database (or token vault) 730 in association with the token H(T). Gateway computer 726 may use a token management service (e.g., token management module 214 in FIG. 2) in order to store the data item T and token H(T) in token database 730. Token database 730 may store a plurality of tokens H(T) and associated data items T, each corresponding to a credential of a plurality of credentials.

At step 718, gateway computer 726 may transmit the token H(T) to resource provider computer 722.

At step 720, resource provider computer 722 may store the token H(T) in token database 724. Resource provider computer 722 can then use the token H(T) for future interactions with a user or user device associated with the user, such as recurring billing interactions.

Figure 9:
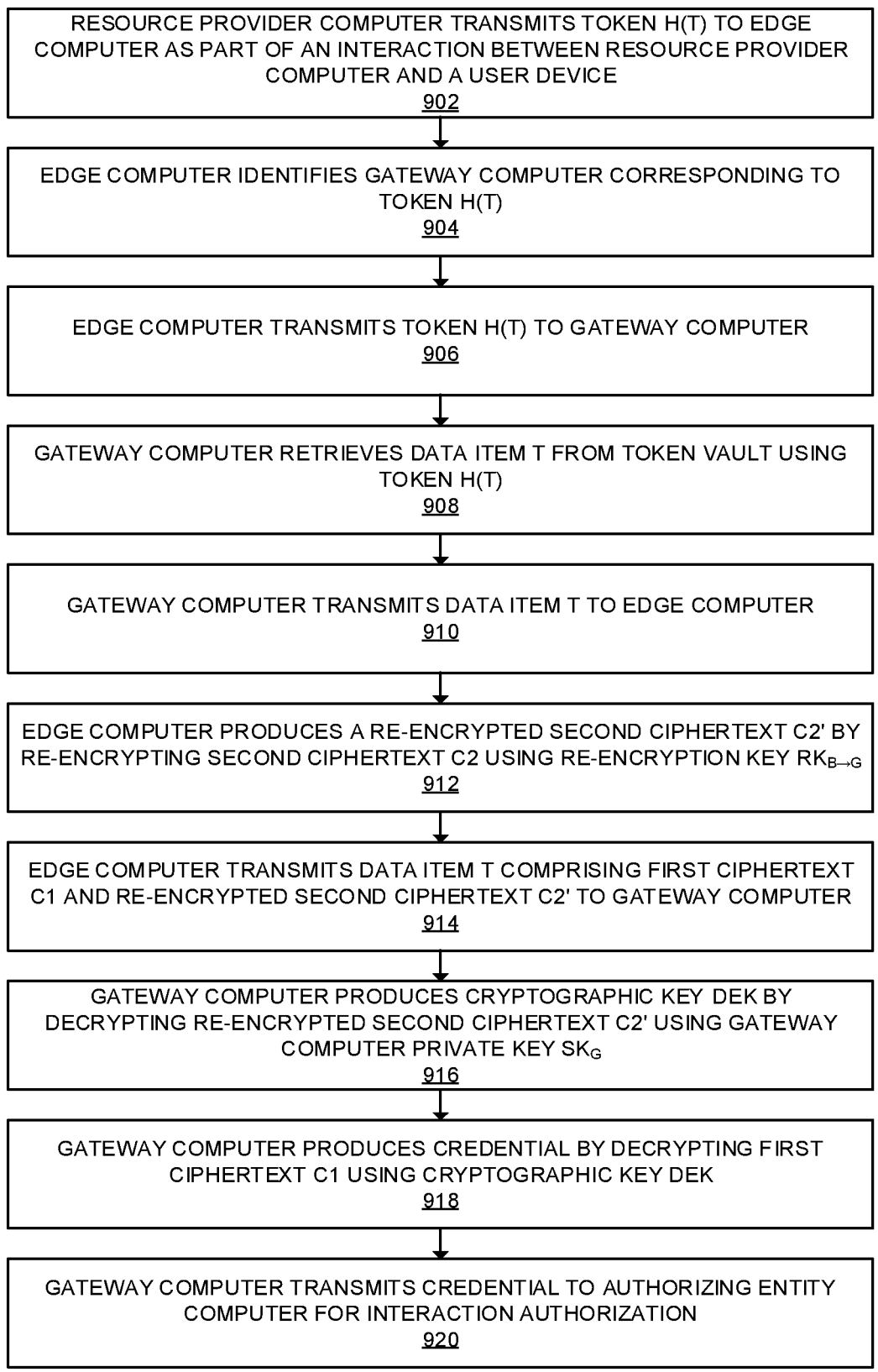
FIG. 9 shows a flowchart of an exemplary interaction phase according to some embodiments.
Figure 10:
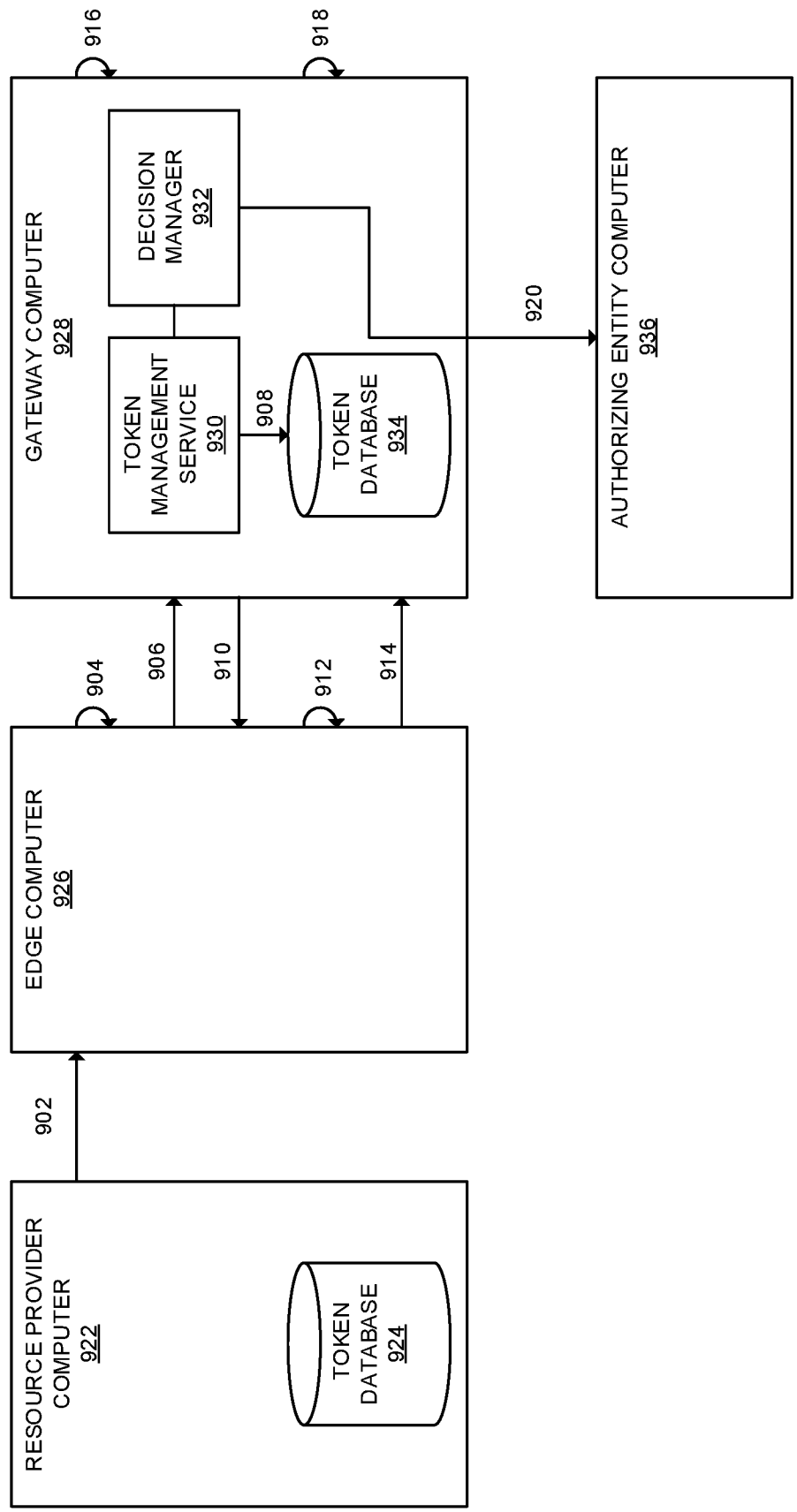
FIG. 10 shows a sequence diagram of an exemplary interaction phase according to some embodiments.

The interaction phase of gateway agnostic tokenization may be better understood with reference to the flowchart of FIG. 9 and the hybrid sequence diagram of FIG. 10. The interaction phase may comprise steps related to transmitting and detokenizing a token in order to authorize an interaction. A ciphertext corresponding to the token may be proxy re-encrypted by the edge computer and the re-encrypted ciphertext may be transmitted to the gateway computer. The gateway computer may decrypt the re-encrypted ciphertext to obtain a cryptographic key. The gateway computer may use that cryptographic key to decrypt another ciphertext to produce the credential. The gateway computer may then transmit the credential to the authorizing entity computer for authorization.

At step 902, resource provider computer 922 may transmit a token H(T) to edge computer 926 as part of an interaction between resource provider computer 922 and a user device. Resource provider computer 922 may initially receive the token H(T) from the user device. Alternatively, resource provider computer 922 may retrieve the token H(T) from token database 924. The token H(T) may have been generated and transmitted to resource provider computer 922 during a token provisioning phase (as described with reference to FIGS. 7-8). Resource provider computer 922 may additionally transmit additional information to edge computer 926, such as a gateway computer identifier.

At step 904, edge computer 926 can identify the gateway computer (e.g., gateway computer 928) corresponding to token H(T). Edge computer 926 may identify the gateway computer using information received from the resource provider computer 922, such as a gateway identifier. In some embodiments, edge computer 926 may be able to identify the gateway computer using the token H(T) itself. For example, the token H(T) may comprise a hash measurement of data item T, along with an alphanumeric sequence identifying the gateway computer corresponding to the token H(T) (i.e., a gateway identifier).

At step 906, edge computer 926 can transmit the token H(T) to the gateway computer identified at step 904. Edge computer 926 can transmit the token H(T) to gateway computer 928 so that gateway computer 928 can retrieve the corresponding data item T in order to provide the corresponding data item T to edge computer 926 for proxy re-encryption. Edge computer 926 may additionally transmit interaction data to gateway computer 928. This interaction data may comprise data corresponding to the interaction between resource provider computer 922 and the user device, such as the time the interaction was initiated, the location of the interaction, an amount associated with the interaction (e.g., a transaction amount), etc. Gateway computer 928 may later use this interaction data in order to evaluate the interaction prior to transmitting the credential to authorizing entity computer 936 for authorization.

At step 908, gateway computer 928 can retrieve the data item T comprising the first ciphertext C1 and second ciphertext C2 using the token H(T). The gateway computer 928 may use a token management service 930 in order to retrieve the data item T from token database (or token vault) 934. For example, gateway computer 928 can retrieve the data item T from the token database 934 using the token H(T) as a query. The token vault 934 may store a plurality of data items comprising a plurality of first ciphertexts and a plurality of second ciphertexts, and the plurality of data items may correspond to a plurality of tokens, also stored within token vault 934.

At step 910, gateway computer 928 can transmit data item T to edge computer 926. Edge computer 926 can use the second ciphertext C2, in data item T, along with the re-encryption key $RK_{B \rightarrow G}$ to produce the re-encrypted second ciphertext C2'. Edge computer 926 can also use data item T to verify the token H(T) received from resource provider computer 922. For example, the edge computer can verify the token H(T) by generating a hash measurement of the data item T (i.e., a hash measurement of the first ciphertext C1 and the second ciphertext C2) and comparing the token H(T) to the hash measurement. In some embodiments, particularly those where edge computer 926 does not verify the token H(T), gateway computer 928 may transmit only the second ciphertext C2 to edge computer 926, rather than the data item T.

At step 912, edge computer 926 can produce the re-encrypted second ciphertext C2' by re-encrypting the second ciphertext C2 using the re-encryption key $RK_{B \rightarrow G}$. In some embodiments, particularly those with multiple gateway computers and multiple corresponding re-encryption keys $RK_{B \rightarrow G}$, edge computer 926 can first identify the re-encryption key $RK_{B \rightarrow G}$ corresponding to gateway computer 928 based on a gateway identifier. The gateway identifier may be uniquely associated with gateway computer 928, and may be of a plurality of gateway identifiers, each associated with a corresponding gateway computer.

As stated above with reference to FIGS. 5-6, the re-encryption key $RK_{B \rightarrow G}$ may have been created by a token server computer during the key provisioning phase, and may correspond specifically to gateway computer 928. The re-encryption key $RK_{B \rightarrow G}$ may be based on a gateway computer public key $PK_G$ and a token server computer private key $SK_B$.

At step 914, edge computer 926 can transmit the data item T comprising the first ciphertext C1 and re-encrypted second ciphertext C2' to gateway computer 928. Alternatively, if edge computer 926 only received the second ciphertext C2 from gateway computer 928 at step 910, edge computer 926 may only transmit the re-encrypted second ciphertext C2' to gateway computer 928.

At step 916, gateway computer 928 can produce the cryptographic key DEK by decrypting the re-encrypted second ciphertext C2' using the gateway computer private key $SK_G$ generated during the key provisioning phase. Having obtained the cryptographic key DEK, gateway computer 928 can decrypt the first ciphertext C1 using the cryptographic key DEK in order to obtain the credential.

At step 918, gateway computer 928 can obtain or produce the credential by decrypting the first ciphertext C1 using the cryptographic key DEK obtained at step 916. Having obtained the credential, gateway computer 928 can then transmit the credential to authorizing entity computer 936 for authorization.

Optionally, in some embodiments, prior to step 920, gateway computer 928 may evaluate the interaction based on the credential decrypted at step 918 and the interaction data. Gateway computer 928 may use decision manager 932 to perform this evaluation. As described above with reference to FIG. 2, gateway computer 928 may evaluate the interaction to determine whether the interaction is legitimate or fraudulent prior to transmitting the credential to authorizing entity computer 936 for authorization. Gateway computer 928 may evaluate interaction data to determine a risk score or any other appropriate indication of the legitimacy or fraudulence of the interaction. For example, gateway computer 928 may use a machine learning model to evaluate the time during which the interaction is taking place, or the location from which the interaction originated.

At step 920, gateway computer 928 can transmit the credential to authorizing entity computer 936 for interaction. Gateway computer 928 may additionally transmit any additional interaction data to authorizing entity computer 936. Authorizing entity computer 936 can determine whether or not to authorize the interaction based on the credential and any received interaction data. In some embodiments, gateway computer 928 may generate an authorization request message comprising the credential and transmit the authorization request message to authorizing entity computer 936 for authorization. In some embodiments, authorizing entity computer 936 may comprise an issuer computer (e.g., a computer associated with an issuer bank) associated with a user of the user device and the credential. For example, the issuer computer may comprise a computer associated with a bank that maintains a payment account on behalf of the user.

If authorizing entity computer 936 decides to authorize the interaction, authorizing entity computer 936 may generate an authorization response message and transmit the authorization response message back to gateway computer 928. Gateway computer 928 may forward the authorization response message to resource provider computer 922 via edge computer 926. Provided that the interaction was approved, the interaction between resource provider computer 922 and the user device can be completed. For example, if the interaction comprises a transaction, resource provider computer 922 can provide a good (e.g., a digital movie file) to the user device. At the end of the day or at another appropriate time, a clearing and settlement process may take place between an issuing bank associated with authorizing entity computer 936 and an acquiring bank associated with resource provider computer 922.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
receiving, by a gateway computer, a token from an edge computer during an interaction between a resource provider computer and a user device, wherein the resource provider computer transmits the token to the edge computer;
determining, by the gateway computer, a data item comprising a first ciphertext and a second ciphertext associated with the token in a database;
transmitting, by the gateway computer, the second ciphertext to the edge computer, wherein the edge computer produces a re-encrypted second ciphertext by re-encrypting the second ciphertext;
receiving, by the gateway computer, the re-encrypted second ciphertext from the edge computer;
decrypting, by the gateway computer, the re-encrypted second ciphertext with a gateway computer private key to obtain a cryptographic key;
decrypting, by the gateway computer, the first ciphertext with the cryptographic key to obtain a credential; and
transmitting, by the gateway computer, the credential to an authorizing entity computer, wherein the authorizing entity computer determines whether or not to authorize the interaction.

2. The method of claim 1, wherein the edge computer produces the re-encrypted second ciphertext using a re-encryption key, and wherein the re-encryption key corresponds to a proxy re-encryption scheme.

3. The method of claim 1, further comprising:
receiving, by the gateway computer, from the edge computer, interaction data; and
before transmitting, by the gateway computer, the credential to the authorizing entity computer, evaluating, by the gateway computer, the interaction based on the interaction data and the credential.

4. The method of claim 1, wherein the database comprises a token vault, wherein the gateway computer stores a plurality of data items in the token vault, the plurality of data items comprising a plurality of first ciphertexts and a plurality of second ciphertexts, the plurality of data items corresponding to a plurality of tokens.

5. The method of claim 1, wherein the authorizing entity computer comprises an issuer computer associated with a user of the user device and the credential.

6. The method of claim 1, wherein the user device transmits the token to the resource provider computer before the resource provider computer transmits the token to the edge computer.

7. The method of claim 1, wherein the edge computer comprises a computer in a cloud computing network.

8. The method of claim 1, wherein the token comprises a hash measurement of the data item.

9. The method of claim 8, further comprising:
transmitting, by the gateway computer, the first ciphertext to the edge computer, wherein the edge computer produces the hash measurement of the data item using a hash function, the first ciphertext, and the second ciphertext, and wherein the edge computer verifies the data item by comparing the hash measurement to the token.

10. The method of claim 1, wherein:
the edge computer produces the re-encrypted second ciphertext by re-encrypting the second ciphertext with a re-encryption key;
the re-encryption key is created by a token server computer and corresponds to the gateway computer; and
the re-encryption key is based on a gateway computer public key and a token server computer private key.

11. The method of claim 10, wherein:
the re-encryption key is one of a plurality of re-encryption keys;
the gateway computer is one of a plurality of gateway computers;
a plurality of gateway identifiers correspond to the plurality of gateway computers;
the plurality of re-encryption keys correspond to the plurality of gateway computers; and
before producing the re-encrypted second ciphertext by re-encrypting the second ciphertext with a re-encryption key, the edge computer identifies the re-encryption key based on a gateway identifier of the plurality of gateway identifiers associated with the gateway computer.

12. The method of claim 10, wherein the token server computer transmits the re-encryption key to the edge computer, or wherein the method further comprises:
transmitting, by the gateway computer, the re-encryption key to the edge computer.

13. The method of claim 1, further comprising:
prior to the interaction between the resource provider computer and the user device, receiving, by the gateway computer, the credential from the resource provider computer;
transmitting, by the gateway computer the credential to a token server computer, wherein the token server computer generates the data item comprising the first ciphertext and the second ciphertext, and wherein the token server computer transmits the data item to the gateway computer;
receiving, by the gateway computer, the data item from the token server computer;
generating, by the gateway computer, a token using a hash function and the data item, wherein the token comprises a hash measurement of the data item;
storing, by the gateway computer, the data item in the database in association with the token; and
transmitting, by the gateway computer, the token to the resource provider computer, wherein the resource provider computer stores the token.

14. The method of claim 13, wherein the token server computer corresponds to an issuing entity associated with a user of the user device.

15. A gateway computer comprising: a processor; and
a non-transitory computer readable medium coupled to the processor, the non-transitory computer readable medium comprising code, executable by the processor for implementing a method comprising:

receiving a token from an edge computer during an interaction between a resource provider computer and a user device, wherein the resource provider computer transmits the token to the edge computer;

determining a data item comprising a first ciphertext and a second ciphertext associated with the token in a database;

transmitting the second ciphertext to the edge computer, wherein the edge computer produces a re-encrypted second ciphertext by re-encrypting the second ciphertext;

receiving the re-encrypted second ciphertext from the edge computer;

decrypting the re-encrypted second ciphertext with a gateway computer private key to obtain a cryptographic key;

decrypting the first ciphertext with the cryptographic key to obtain a credential; and transmitting the credential to an authorizing entity computer, wherein the authorizing entity computer determines whether or not to authorize the interaction.

16. A method comprising:

receiving, by an edge computer, from a resource provider computer, a token as part of an interaction between the resource provider computer and a user device;

identifying, by the edge computer, based on the token, a gateway computer;

transmitting, by the edge computer, to the gateway computer, the token, wherein the gateway computer identifies a data item comprising a first ciphertext and a second ciphertext corresponding to the token in a database;

receiving, by the edge computer, from the gateway computer, the second ciphertext;

producing, by the edge computer, a re-encrypted second ciphertext by re-encrypting the second ciphertext using a re-encryption key; and transmitting, by the edge computer, to the gateway computer, the re-encrypted second ciphertext, wherein the gateway computer produces a cryptographic key by decrypting the re-encrypted second ciphertext using a gateway computer private key, produces a credential by decrypting the first ciphertext using the cryptographic key, and transmits the credential to an authorizing entity computer, wherein the authorizing entity computer determines whether or not to authorize the interaction.

17. The method of claim 16, further comprising:

receiving, by the edge computer, from the gateway computer, the first ciphertext;

generating, by the edge computer, a hash measurement of the first ciphertext and the second ciphertext; and verifying, by the edge computer, the token by comparing the token to the hash measurement.

18. The method of claim 16, further comprising:

receiving, by the edge computer, from a token server computer, the re-encryption key, wherein the re-encryption key is generated by the token server computer, and wherein the re-encryption key is based on a token server computer private key and a gateway computer public key.

19. The method of claim 16, wherein:

the re-encryption key is one of a plurality of re-encryption keys;

the plurality of re-encryption keys correspond to a plurality of gateway computers;

the plurality of gateway computers correspond to a plurality of gateway identifiers; and the method further comprises identifying, by the edge computer, the re-encryption key based on a gateway identifier of the plurality of gateway identifiers associated with the gateway computer.

20. The method of claim 19, further comprising:

receiving, by the edge computer, from the gateway computer or a token server computer, a server-less function, wherein the edge computer uses the server-less function to identify the re-encryption key based on the gateway identifier and produces the re-encrypted second ciphertext.

* * * * *